United States Patent
Kim et al.

(10) Patent No.: US 12,381,200 B2
(45) Date of Patent: Aug. 5, 2025

(54) ELECTRODE FOR SECONDARY BATTERIES CONTAINING HIGH-DENSITY CARBON DEFECT STRUCTURE AND METHOD OF PRODUCING THE SAME

(71) Applicant: KOREA ADVANCED INSTITUTE OF SCIENCE AND TECHNOLOGY, Daejeon (KR)

(72) Inventors: Hee-Tak Kim, Daejeon (KR); Juhyuk Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 204 days.

(21) Appl. No.: 17/133,819

(22) Filed: Dec. 24, 2020

(65) Prior Publication Data
US 2021/0288303 A1    Sep. 16, 2021

(30) Foreign Application Priority Data
Mar. 12, 2020 (KR) .................. 10-2020-0030791

(51) Int. Cl.
*H01M 4/04* (2006.01)
*H01M 4/133* (2010.01)
(Continued)

(52) U.S. Cl.
CPC ....... *H01M 4/0471* (2013.01); *H01M 4/0404* (2013.01); *H01M 4/133* (2013.01);
(Continued)

(58) Field of Classification Search
CPC .......... H01M 4/62; H01M 4/96; H01M 4/133; H01M 4/583; H01M 4/0404;
(Continued)

(56) References Cited

U.S. PATENT DOCUMENTS

| 2002/0010261 | A1* | 1/2002 | Callahan ............ H01B 1/122 524/832 |
| 2017/0141405 | A1* | 5/2017 | Neumann ........... H01M 4/8842 |
| 2019/0067730 | A1* | 2/2019 | Archer ............. H01M 10/0567 |

FOREIGN PATENT DOCUMENTS

| CN | 109411739 A * | 3/2019 | ............ B82Y 30/00 |
| EP | 3597800 A1 * | 1/2020 | |

(Continued)

OTHER PUBLICATIONS

Gadipelli, Srinivas, and Zheng Xiao Guo. "Tuning of ZIF-derived carbon with high activity, nitrogen functionality, and yield—a case for superior CO2 capture." ChemSusChem 8.12 (2015): 2123-2132 (Year: 2015).*

(Continued)

*Primary Examiner* — Matthew T Martin
*Assistant Examiner* — Jared Hansen
(74) *Attorney, Agent, or Firm* — HULTQUIST, PLLC; Steven J. Hultquist

(57) ABSTRACT

Disclosed are an electrode for secondary batteries containing a high-density carbon defect structure and a method of producing the same. The electrode can prevent deterioration of battery performance due to dendrite formation by inhibiting self-diffusion and aggregation of metal nuclei, and can exhibit an unprecedentedly high number of charge/discharge cycles and excellent energy efficiency by uniformly electrodepositing metal ions on the surface of the electrode. When the method of producing a carbon electrode for a secondary battery is used, an electrode containing a high-density carbon defect structure can be produced, and thus a battery with higher efficiency and a longer lifespan can be produced. The secondary battery comprising the electrode is useful for fields related to medium/large-scale energy stor- (Continued)

age technology, in particular, for mobile devices, batteries, and renewable-energy power generation systems.

5 Claims, 21 Drawing Sheets
(19 of 21 Drawing Sheet(s) Filed in Color)

(51) Int. Cl.
  *H01M 4/1393* (2010.01)
  *H01M 4/583* (2010.01)
  *H01M 10/054* (2010.01)
  *H01M 4/02* (2006.01)

(52) U.S. Cl.
  CPC ......... *H01M 4/1393* (2013.01); *H01M 4/583* (2013.01); *H01M 10/054* (2013.01); *H01M 2004/021* (2013.01)

(58) Field of Classification Search
  CPC ............. H01M 4/0471; H01M 4/1393; H01M 4/8642; H01M 4/8673; H01M 8/188; H01M 10/054; H01M 12/06; H01M 12/085; H01M 2004/021; Y02E 60/10; Y02E 60/50
  See application file for complete search history.

(56) References Cited

FOREIGN PATENT DOCUMENTS

| JP | 622472 | A |   | 8/1987 |
| JP | 2004134516 | A |   | 4/2004 |
| JP | 200666334 | A |   | 3/2006 |
| JP | 2015135770 | A | * | 7/2015 |
| WO | 2018155648 | A |   | 8/2018 |

OTHER PUBLICATIONS

Wang, Miao, et al. "From metal-organic frameworks to porous carbons: a promising strategy to prepare high-performance electrode materials for capacitive deionization." Carbon 108 (2016): 433-439 (Year: 2016).*
Wang, Yanfang, et al. "ZIF-8@ MWCNT-derived carbon composite as electrode of high performance for supercapacitor." Electrochimica Acta 213 (2016): 260-269 (Year: 2016).*
Chen, Ke, et al. "Metal-organic frameworks (MOFs)-Derived nitrogen-doped porous carbon anchored on graphene with multifunctional effects for lithium-sulfur batteries." Advanced functional materials 28.38 (2018): 1707592 (Year: 2018).*
Li, Yiming, et al. "Ultrathin, highly branched carbon nanotube cluster with outstanding oxygen electrocatalytic performance." Electrochimica Acta 282 (2018): 224-232 (Year: 2018).*
Sui, Xu-Lei, et al. "Nitrogen-doped graphene aerogel with an open structure assisted by in-situ hydrothermal restructuring of ZIF-8 as excellent Pt catalyst support for methanol electro-oxidation." International Journal of Hydrogen Energy 43.48 (2018): 21899-21907 (Year: 2018).*
Zhu, Yuanzhi, et al. "Engineering local coordination environments of atomically dispersed and heteroatom-coordinated single metal site electrocatalysts for clean energy-conversion." Advanced Energy Materials 10.11 (2020): 1902844 (first published Dec. 20, 2019) (Year: 2019).*
Li, Yiming, et al. "Ultrathin, highly branched carbon nanotube cluster with outstanding oxygen electrocatalytic performance." Electrochimica Acta 282 (2018): 224-232 and SI. Updated to include the Appendix material. (Year: 2018).*
Chaikittisilp, Watcharop, et al. "Nanoporous carbons through direct carbonization of a zeolitic imidazolate framework for supercapacitor electrodes." Chemical communications 48.58 (2012): 7259-7261. (Year: 2012).*
Srinivas, Gadipelli, et al. "Exceptional CO2 capture in a hierarchically porous carbon with simultaneous high surface area and pore volume." Energy & Environmental Science 7.1 (2014): 335-342 (Year: 2014).*
Abbasi, Zahra, et al. "Effect of carbonization temperature on adsorption property of ZIF-8 derived nanoporous carbon for water treatment." Microporous and Mesoporous Materials 236 (2016): 28-37. (Year: 2016).*
Zhou, Na, et al. "Facile synthesis of hierarchically porous carbons by controlling the initial oxygen concentration in-situ carbonization of ZIF-8 for efficient water treatment." Chinese journal of chemical engineering 26.12 (2018): 2523-2530 (Year: 2018).*
Yuksel, Recep, et al. "Metal-organic framework integrated anodes for aqueous zinc-ion batteries." Advanced Energy Materials 10.16 (2020): 1904215 (Year: 2020).*
Toth, Pal. "Nanostructure quantification of turbostratic carbon by HRTEM image analysis: State of the art, biases, sensitivity and best practices." Carbon 178 (2021): 688-707 (Year: 2021).*
Zhang, Guanhua, et al. "High-performance and ultra-stable lithium-ion batteries based on MOF-derived ZnO@ ZnO quantum Dots/C core-shell nanorod arrays on a carbon cloth anode." Advanced Materials 27.14 (2015): 2400-2405 (Year: 2015).*
Wu, M. C., et al. "Carbonized tubular polypyrrole with a high activity for the Br2/Br-redox reaction in zinc-bromine flow batteries." Electrochimica Acta 284 (2018): 569-576 (Year: 2018).*
Yuan, Zhizhang, et al. "Advanced materials for zinc-based flow battery: development and challenge." Advanced Materials 31.50 (2019): 1902025 (Year: 2019).*
CN109411739A, Lu, et al. "Self-power-generation and long-service-life Zn—CoNC zinc-air battery and application thereof", machine English translation retrieved from https://worldwide.espacenet.com/ Date: Dec. 3, 2024 (Year: 2019).*
JP2015135770A, Yamamoto, et al. "Negative electrode and nonaqueous electrolyte battery", machine English translation retrieved from https://worldwide.espacenet.com/ Date: Apr. 21, 2025 (Year: 2015).*
Hegde, V., et al., "Stacking Faults and Mechanical Behavior beyond the Elastic Limit of an Imidazole-Based Metal Organic Framewor—ZIF-8", The Journal of Physical Chemistry Letters, 2013, pp. 3377-3381; dx.doi.org/10.1921/jz40167341, vol. 4, Publisher: ACS Publications.
Yu, F., et al., "High yield of hydrogen peroxide on modified graphite felt electrode with nitrogen-doped porous carbon carbonized by zeolitic imidazolate framework-8 (ZIF-8) nanocrystals", Environmental Pollution, 2019, p. 113119; http://doi.org/10.1016/j.envpol.2019/113119, vol. 255, Publisher: Elsevier.
Yu, H., et al., "Porous carbon derived from metal organic framework@graphine quantum dots as electrode materials for supercapacitors and lithium-ion batteries", RSC Advances, 2019, pp. 9577-9583, vol. 9, Publisher: Royal Society of Chemistry.
Yuksel, R., et al., "Metal-Organic Framework Integrated Anodes for Aqueous Zinc-Ion Batteries", Adv. Energy Mater., 2020, pp. 1-8 DOI: 10.1002/aenm.201904215, vol. 1904215, Publisher: Wiley-VCH-Verlag GmbH & Co.
Banhart, F., et al., "Structural Devects in Graphene", "ACS NANO", 2010, Page(s) 10.1021/nn102598m, vol. 5, No. 1, Publisher: www.acsnano.org.
Banik, S., et al., "Suppressing Dendrite Growth during Zinc Electrodeposition by PEG-200 Additive", "Journal of Electrochemical Society", 2013, pp. D519-D523, vol. 160.
Carradec, Q., et al., "A global ocean atlas of eukaryotic genes", "Nature Communications", 2018, Page(s) DOI:10.1038/s41467-017-02342-1, vol. 9, No. 373.
Jiang, H.R., et al., "Towards a uniform distribution of zinc in the negative electrode for zinc bromine flow batteries", "Applied Energy", 2018, pp. 366-374, vol. 213, Publisher: Elsevier.
Krasheninnikov, A.V., et al., "Bending the rules: Contrasting vacancy energetics and migration in graphite and carbon nanotubes", "Chemical Physics Letters", , pp. 132-136, vol. 418, Publisher: Elsevier.
Laska, C., et al., "Effect of hydrogen carbonate and chloride on zinc corrosion investigated by a scanning flow cell system", "Electrochimica Acta", 2015, pp. 198-209, vol. 159, Publisher: Elsevier.
Li, C., et al., "Two-dimensional molecular brush-functionalized porous bilayer composite separators toward ultrastable high-current

(56) References Cited

OTHER PUBLICATIONS density lithium metal anodes", "Nature Communications", 2019, Page(s) https://doi.org/10.1038/s41467-019-09211-z.

Mainar, A., et al., "A brief overview of secondary zinc anode development:: The key of improving zinc-based energy storage systems", "International Journal of Energy Research", May 7, 2017, Page(s) DOI:10.1002/er.3822; 1-16, Publisher: Wiley.

Orazem, M., et al., "Electrochemical Impedance Spectroscopy", "The Elecrochemical Society Series (ECS)", 2008, Page(s) http://www.electrochem.org, Publisher: John Wiley & Sons, Inc.

Pei, A., et al., "Nanoscale Nucleation and Growth of Electrodeposited Lithium Metal", "Nano Letters", 2017, Page(s) DOI: 10.1021/acs.nanolett.6b04755, vol. 17, Publisher: ACS Publications.

Rajarathnam, G., et al., "The Zinc/Bomine Flow Battery Materials Challenges and Practical Solutions for Technology Advancement", "Springer Briefs in Energy", 2016, Page(s) DOI 10.1007/978-981-287-646-1, Publisher: Springer.

Safaei, M., et al., "A review on metal-orgnic frameworks: Synthesis and applications", "Trends in Analytical Chemistry", 2019, pp. 401-425, vol. 118, Publisher: Elsevier.

Ustarroz, J., et al., "New Insights into the Early Stages of Nanoparticle Electrodeposition", "The Journal of Physical Chemistry", 2011, pp. 2322-2329, vol. 116, Publisher: ACS Publication.

Ustarroz, J., et al., "A Generalized Electrochemical Aggregative Growth Mechanism", "Journal of the American Chemical Society", 2013, Page(s) DOI: 10.1021/ja402598k, Publisher: ACS Publications.

Ustarroz, J., et al., "The Role of Nanocluster Aggregation, Coalescence, and Recrystallization in the Electrochemical Deposition of Platinum Nanostructures", "Chemistry of Materials", 2014, pp. 2396-2406, vol. 26, Publisher: ACS Publications.

Wang, F., et al., "Highly reversible zinc metal anode for aqueous batteries", "Nature Materials", 2018, Page(s) https://doi.org/10.1038/s41563-018-0063-z, vol. 3, Publisher: Macmillam Publishers.

Wang, Z., et al., "A Metal-Organic Framework Host for Highly Reversible Dendrite-free Zinc Metal Anodes", "Joule", May 15, 2019, pp. 1289-1300, vol. 3, Publisher: CellPress.

Xu, W., et al., "Lithium metal anodes for rechargeable batteries", "Energy & Environmental Science", 2014, pp. 513-537, vol. 7, Publisher: Royal Society of Chemistry.

Zhang, Z., et al., "Highly graphitized nitrogen-doped porous carbon nanopolyhedra derived from ZIF-8 nanocrystals as efficient electrocatalysts for oxygen reduction reactions", "Nanoscale", 2014, Page(s) DOI: 10.1039/c0xx00000x, Publisher: The Royal Society of Chemistry.

Zhang, R., et al., "Lithiophilic Sites in Doped Graphene Guide Uniform Lithium Nucleation for Dendrite-Free Lithium Metal Anodes", "Angewandte Chemie International Edition", 2017, Page(s) DOI: 10.1002/anie.201702099, vol. 56, Publisher: Wiley-VCH Verlag GmbH & Co.

Zhu, M., et al., "Dendrite-Free Metallic Lithium in Lithiophilic Carbonized Metal-Organic Frameworks", "Advanced Energy Materials", 2018, Page(s) DOI: 10.1002/aenm.201703505, vol. 8, Publisher: Wiley-VCH Velag GmbH & Co.

Jackle, M., et al., "Self-diffusion barriers: possible descriptors for dendrite growth in batteries", Energy & Environmental Science, 2018, pp. 3400-3407, vol. 11, Publisher: Royal Society of Chemistry.

Lee, J-H, et al., "High-Energy Efficiency Membraneless Flowless Zn—Br Battery: Utilizing the Electrochemical-Chemical Growth of Polybromides", Advanced Materials, 2019, p. 1904524, vol. 31, Publisher: Wiley-VCH Verlag GmbH & Co.

English Translation of Notice of Allowance issued in counterpart Japanese Patent Application No. 2021-012762 on Apr. 7, 2023.

Notice of Allowance issued in counterpart Japanese Patent Application No. 2021-012762 on Apr. 7, 2023.

* cited by examiner

| Sample | Concentration (at.%) | | |
|---|---|---|---|
| | C | O | N |
| pCF | 97.83 | 2.17 | - |
| CZ-1 | 93.62 | 3.97 | 2.41 |
| CZ-5 | 94.48 | 4.1 | 1.21 |

ELECTRODE FOR SECONDARY BATTERIES CONTAINING HIGH-DENSITY CARBON DEFECT STRUCTURE AND METHOD OF PRODUCING THE SAME

CROSS-REFERENCE TO RELATED APPLICATION

The priority under 35 USC § 119 of Korean Patent Application 10-2020-0030791 filed Mar. 12, 2020 for "ELECTRODE FOR SECONDARY BATTERIES CONTAINING HIGH-DENSITY CARBON DEFECT STRUCTURE AND METHOD OF PRODUCING THE SAME" is hereby claimed. The disclosure of Korean Patent Application 10-2020-0030791 is hereby incorporated herein by reference, in its entirety, for all purposes.

BACKGROUND OF THE INVENTION

Field of the Invention

The present invention relates to an electrode for secondary batteries containing a uniformly distributed high-density carbon defect structure and a method of producing the same. More particularly, the present invention relates to a carbon electrode containing a carbon defect structure and a method of producing the carbon electrode comprising coating with a metal-organic framework (MOF) on an electrode substrate and carbonizing the MOF-coated electrode substrate to form a carbon layer containing a carbon defect structure.

Description of the Related Art

A secondary battery is a battery that can be used semi-permanently by charging with electricity generated in the course of causing oxidation/reduction reactions of materials between a cathode and an anode by a current supplied from an external power source. The secondary battery includes four core materials, including a cathode material, an anode material, separator and an electrolyte. A primary battery (general battery), which is used once and then discarded, is disadvantageous in that it cannot be reused and incurs high costs for disposing of or recycling the battery, whereas a secondary battery has an advantage of being rechargeable multiple times. In addition, the secondary battery is a core component of electric vehicles as well as portable electronic devices such as notebook computers, mobile phones, and camcorders, and is considered one of three major electronic components in the 21st century, along with semiconductors and displays, due to the high added value thereof. In particular, the global market for secondary batteries exceeded $20 billion in 2011, and the global market for secondary batteries is expected to further expand in the future owing to the growth of the electric vehicle market and the growth of the secondary battery market for medium- and large-sized energy storage.

Unlike conventional secondary batteries, redox flow batteries are batteries that are charged or discharged through electron supply and receipt of active materials such as zinc and vanadium dissolved in an electrolyte, and are in the spotlight as next-generation secondary batteries. Redox flow batteries have a lifespan longer than at least 10 times that of conventional lithium-ion batteries, and the usage time thereof can be increased as much as desired depending on the storage capacity. The redox flow batteries can be applied through large-scale energy storage technology to renewable energy generation systems and power plants, uninterruptible power supplies for buildings and semiconductor factories, and power for unmanned base stations.

Since secondary batteries are characterized by being repeatedly usable through continuous charge and discharge cycles, charge/discharge efficiency and battery lifespan are very important factors in the development of secondary batteries. In particular, repeated charging and discharging degrades the electrodes of the battery and rapidly decreases the lifespan of the battery due to the formation of dendrites of metal ions. In the field of secondary batteries, the development of high-efficiency batteries having a long lifespan continues to attract a great deal of attention.

In order to prevent the formation of dendrites in secondary batteries, various methods such as addition of electrolyte additives (J. Electrochem. Soc., 2013, 160, D519-D523; Electrochim. Acta, 2015, 159, 198-209), electrolyte affinity hosts (Joule, 2019, 3, 1289-1300), and highly concentrated electrolytes (Nature materials, 2018, 17, 543) have been attempted. However, there is a need for measures to increase environmental friendliness and reduce costs due to problems of environmental pollution and high cost.

Meanwhile, zinc (Zn) has been regarded as an ideal material in the field of chemical batteries since batteries first appeared due to characteristics such as high capacity (820 mAh/g), low electrochemical potential (0.762 V VS. standard hydrogen electrode (SHE)), high abundance, low toxicity and inherent safety in aqueous electrolytes. In particular, Zn redox flow batteries have great potential for application in industrial fields due to the high energy density and low material cost thereof.

However, zinc (Zn)-based secondary batteries undergo gradual degradation in lifespan when they are continuously charged and discharged due to the irreversibility of oxidation-reduction (electrodeposition/dissolution) processes, like other secondary batteries. This problem is mainly caused by the formation of demonic Zn dendrites, and the demonic Zn dendrites cause electrically unconnected Zn electrodeposition or short circuits (Nat. Commun., 2018, 9, 3731; Nature Materials, 2018, 17, 543; G. P. Rajarathnam, 2016; Int. J. Energy Res., 2018, 42, 903-918, etc.). The electrodeposition of non-uniform Zn such as Zn dendrites increases as the current density increases, thus limiting the power density of the battery.

The results of conventional approaches described above show low current density and cycling stability which are inapplicable to industry. Conventional approaches to prevent the formation of dendrites have mainly been based on the idea that the initial Zn electrodeposition spatial distribution determines the shape of Zn electrodeposition. For example, in the field of Li metal electrode technology, many efforts have been made to uniformize the initial Li electrodeposition by expanding the electrode surface or inducing a uniform electric field or Li ion flux (Advanced Energy Materials, 2018, 8, 1703505; Nat. Commun., 2019, 10, 1363; Angew. Chem., Int. Ed., 2017, 56, 7764-7768). This approach is based on the Scharifker and Hills model, and is suggested from the hypothesis that the metal nucleus grows from a generation site of the metal nucleus under the assumption that ions are directly reduced on the surface and the metal nucleus grows (Nano Letters, 17 1132 (2017); Energy & Environ. Sci., 7, 513 (2014)). However, this classical model cannot explain the formation of nanoscale dendrites on low-energy substrates such as carbon (Nano Lett., 2017, 17, 1132-1139; ohn Wiley & Sons, 2008). Recently, in order to explain this phenomenon, there has been a report that initially formed nuclei are aggregated or self-aligned, causing the growth of Zn dendrites (Chem.

Mater., 26, 2396 (2014); J. Phys. Chem. C, 116, 2322 (2012); JACS, 135, 11550 (2013)). However, there is no report on a clear mechanism by which the initially formed nuclei are aggregated or self-aligned. There have been reports, based on in-situ analysis such as transmission electron microscopy (TEM) and X-ray scattering, that electrodeposition is impeded by the aggregation and coalescence of metal adatoms and nuclei in low-energy substrates such as carbon (Chemistry of Materials, 2014, 26, 2396-2406).

Meanwhile, it was reported by H. R. Jiang et al., in "Towards a uniform distribution of zinc in the negative electrode for zinc bromine flow batteries" (Applied Energy 213 (2018) 366-374), that single-vacancy defects in zinc bromine flow batteries are expected to play an important role in initial Zn nucleus formation and uniform nucleus distribution on the electrode surface. In the document, an electrode containing a single-vacancy defect was produced by heating to 500° C. without any treatment on carbon felt (SGL carbon). The document reports that the density of the single-vacancy defect in the electrode in the Raman scattering analysis corresponds to an ID/IG ratio of about 0.99 and that zinc is uniformly distributed on the electrode surface, and suggests only the possibility that the single-vacancy defect contributes to the improvement of the battery performance. However, it does not exhibit substantial improvement in battery performance, and as can be seen from the present invention, although the electrode containing a single-vacancy defect with a low density (1.09 (ID/IG)) shows an initially uniform distribution of metal nuclei, cannot effectively prevent the formation of dendrites due to self-aggregation through surface movement of the nucleus and local adhesion of adatoms, but rather exhibited lower battery life and energy efficiency than the defect-free carbon electrode.

Under this technical background, as a result of extensive efforts to develop an electrode for secondary batteries that can significantly improve battery lifespan and energy efficiency through a new approach departing from the conventional dendrite formation mechanism, the inventors of the present application have identified a novel electrode dendrite forming mechanism by self-aggregation and adhesion of metal nuclei.

In addition, in order to develop a battery with a longer lifespan and increased efficiency by inhibiting the formation of dendrites through prevention of self-aggregation and adhesion of nuclei, based on the novel electrode dendrite forming mechanism, an electrode comprising a carbon layer containing a carbon defect structure that is uniformly distributed and has high density was produced by coating with MOF and then carbonization. As a result of these efforts, contrary to the expectations of H. R. Jiang et al., it was confirmed that an electrode containing a carbon defect structure with non-uniformity or a low density of about 1.09 (ID/IG) results in lower battery efficiency than a defect-free carbon electrode, and an electrode containing a high-density carbon defect structure produced through MOF coating and carbonization prevents the self-aggregation and coalescence of metal nuclei, and suppresses the formation of dendrites due to unique crystal growth, in which a metal adatom is electrodeposited on the side of the metal nucleus along the surface of the electrode, thereby realizing a 30-fold improvement in battery lifespan and energy efficiency compared to conventional batteries beyond an increase in the density of the carbon defect structure. The present invention has been completed based on this finding.

SUMMARY OF THE INVENTION

Therefore, the present invention has been made in view of the above problems, and it is one object of the present invention to provide a method of producing an electrode for a secondary battery containing a carbon defect structure.

It is another object of the present invention to provide an electrode comprising a carbon layer containing a carbon defect structure on the surface thereof.

It is another object of the present invention to provide a secondary battery comprising the electrode.

In accordance with an aspect of the present invention, the above and other objects can be accomplished by the provision of a method of producing an electrode comprising, coating with a metal-organic framework (MOF) on an electrode substrate; and carbonizing the MOF-coated electrode substrate to form a carbon layer containing a high-density carbon defect structure.

In accordance with another aspect of the present invention, there is provided an electrode comprising a carbon layer containing a high-density carbon defect structure on the surface thereof.

In accordance with yet another aspect of the present invention, there is provided a secondary battery comprising the electrode.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which:

FIG. 12 in (p) shows the movement path from the center to the edge of the carbon structure fragments of respective defects ($SV_1$, SW (55-77), $DV_2$ (585) and $DV_2$ (555-777)); and FIG. 12 in (q) shows the results of the energy profiles as diffusion paths for various defects.

DETAILED DESCRIPTION OF THE INVENTION

Figure 1:
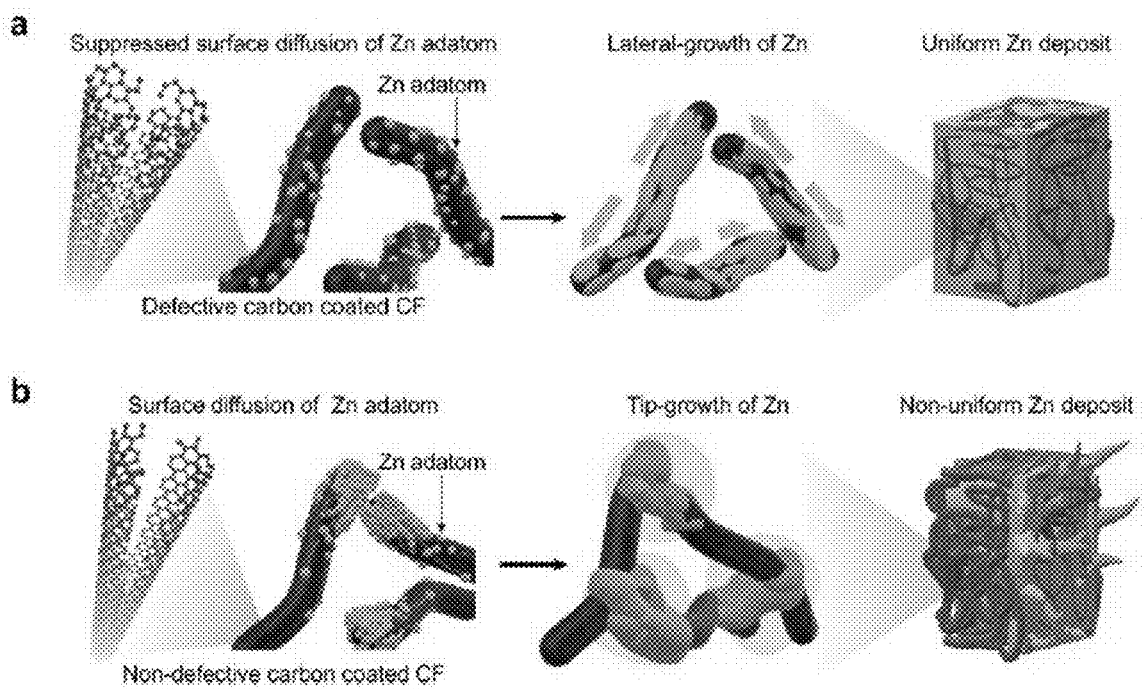
FIG. 1 schematically shows the formation and development of Zn nuclei in electrodes having different densities of defective carbon structures, wherein (a) shows a Zn growth mechanism in an electrode containing a high-density defective carbon structure, and (b) shows a Zn growth mechanism in an electrode containing a defect-free or low-density defective carbon structure.

Unless defined otherwise, all technical and scientific terms used herein have the same meanings as appreciated by those skilled in the field to which the present invention pertains. In general, the nomenclature used herein is well-known in the art and is ordinarily used.

In an embodiment of the present invention, an electrode was produced by coating with ZIF-8 as a MOF on carbon felt as an electrode substrate and carbonizing the carbon felt at a high temperature, and structural analysis and electrode performance analysis of the defective carbon structure of the electrode were performed. As reported by H. R. Jiang et al. in Applied Energy 213 (2018) 366-374, in spite of a rich Zn nuclear distribution, CZ-1 having a defective carbon structure density (1.09 (ID/IG)) similar to that of the electrode in the above document (H. R. Jiang et al.) was found to have lower charge/discharge cycle and energy efficiency than that of the defect-free carbon structure electrode, contrary to expectations pertaining to battery performance.

In another embodiment of the present invention, a clear mechanism by which a metal nucleus moves along the electrode surface from a generation site and the nucleus grows through self-aggregation and coalescence of metal adatoms to form dendrites was found. It was proved that the decrease in efficiency in CZ-1 as described above was due to the inability to effectively suppress self-aggregation of the nucleus and vertical coalescence of adatoms due to the non-uniform low-density defective carbon structure.

In another embodiment of the present invention, in order to effectively suppress the self-aggregation of nuclei and vertical coalescence of adatoms based on this mechanism, an electrode comprising a carbon layer uniformly containing a high-density carbon defect structure was produced by coating carbon felt as an electrode substrate with ZIF-8 (MOF) and carbonizing the carbon felt at a high temperature. It has already been reported that, when MOF is carbonized by heating at a high temperature, other atoms are evaporated, thereby forming a carbon structure layer (L. Zhang, Z. Su, F. Jiang, L. Yang, J. Qian, Y. Zhou, W. Li and M. Hong, Nanoscale, 2014, 6, 6590-6602).

It was found that the electrode comprising a carbon layer uniformly containing high-density carbon defects derived from MOF according to the present invention suppresses dendrite formation even at high current density and dramatically increases battery lifespan and efficiency. This dramatic increase in efficiency is much greater (20 times or more) than the increase in density (about 40% increase), and is 25 to 50 times greater (5000 cycles or more, maintaining coulombic efficiency of 97% or more) compared with the most recently reported electrode.

Summarizing the results found from the examples of the present invention, as anticipated by H. R. Jiang et al., CZ-1 forms rich initial Zn nuclei and has a large surface area, so it is generally expected to be advantageous in terms of metal electrodeposition and electrical efficiency in batteries compared to the conventional approach. However, in fact, it was found that the non-uniformly applied low-density defective carbon structure paradoxically leads to more severe aggregate growth. Thus, this result is contrary to conventional anode design methods such as increasing the surface area for conventional stable and efficient batteries. The electrode containing a high-density defective carbon structure of the present invention exhibits dramatic cycling performance even at a high current density, and is advantageous when used as a battery electrode due to stable Zn growth.

This effect shows that the uniform distribution of the defective carbon structure on the electrode, the strong interaction with the Zn adatoms and nuclei due to the high density, and the suppression of disordered aggregation of the Zn nuclei are due to the relatively uniform growth of Zn in the electrode of the present invention, which demonstrates the notable charge/discharge cycling performance and battery performance at the highest current density of 100 mA/cm$^2$ and 120 mA/cm$^2$, which could not been achieved at all by the prior art.

Thus, in one aspect, the present invention is directed to a method of producing the electrode comprising coating with a metal-organic framework (MOF) on an electrode substrate; and carbonizing the MOF-coated electrode substrate to form a carbon layer containing a carbon defect structure.

As used herein, the term "metal-organic structure" may be abbreviated as "MOF", and refers to a group of compounds of metal ions or clusters that are harmonized with an organic ligand to form a structure having more than one dimension. MOF is used in a variety of fields, comprising gases and liquids, catalysts, various sensors, clean energy and environmental applications, medical and biological fields, and optoelectronic equipment (Trends in Analytical Chemistry 118 (2019) 401-425).

Examples of the metal-organic structure are described in detail in "A review on metal-organic frameworks: Synthesis and applications (Trends in Analytical Chemistry 118 (2019) 401-425)" by M. Safaei et al, but are not limited thereto.

In one embodiment of the present invention, carbon felt as an electrode substrate is coated with a zeolitic imidazole framework, which is one of metal-organic structures, and is then carbonized at a high temperature for a predetermined time to produce an electrode. Carbonization of MOF at a high temperature evaporates metals and atoms such as nitrogen (N) other than carbon without a secondary carbon source, resulting in defective turbostratic carbon containing a high-density carbon defect structure.

In one embodiment of the present invention, ZIF-8 was used as the MOF. However, when the MOF is heated at a high temperature, metals and organic elements other than carbon evaporate, and only the carbon structure remains. Thus, a carbon layer containing a high-density carbon defect structure can be produced even using other types of MOF.

Therefore, in the present invention, any one known as the metal-organic structure may be used, and the metal-organic structure is preferably selected from the group consisting of $Zn_2DOT$ (MOF-74), $Cu_2$ $(BDC-Br)_2(H_2O)_2$ (MOF-101), $ZN_4O(BTB_2$ (MOF-177), $[Fe_3O(BDC)_3(DMF)_3][FeCl_4]\cdot(DMF)_3$ (MOF-235), $Al(OH)(BPYDC)$ (MOF-253), $ZN_4O(BDC)_3\cdot7DEF\cdot3H_2O$ (IRMOF-1 (MOF-5)), $Zn_4O(TPDC)_3\cdot17DEF\cdot2H_2O$ (IRMOF-16), $Zr_6O_6(BDC)_6$ (UiO-66), $Zr_6O_6(BPDC)_6$ (UiO-67), $Zr_6O_6(TPDC)_6$ (UiO-68), $Al(OH)(BDC)$ (MIL-53), $Al(OH)(BDC-NH_2)$ (MIL-53 (Al)—$NH_2$), $Fe_3O(MeOH)_3(O_2CCH=CHCO_2)_3\cdot MeCO_2\cdot nH_2O$ (MIL-88A), $Fe_3O(MeOH)_3(O_2C(CH_2)_2CO_2)_3\cdot AcO\cdot(MeOH)_{4.5}$ (MIL-88-Fe), $2Fe_3O(OH)(H_2O)_2$ $(BDC-Me_2)_3$ (MIL-88B-4CH$_3$), $Fe^{III}_3O(H_2O)_2F\cdot(BTC)_2\cdot nH_2O$ (MIL-100-Fe), $Cr_3O(H_2O)_2F\cdot(BDC)_3\cdot NH_2O$ (MIL-101), $Cu_3(BTC)_2$ (HKUST-1 (MOF-199)), $Gd_2(BDC-NH_2)_3(DMF)_4$ (LIC-10), $Zn(MIM)_2$ (ZIF-8), $Zn(FIM)_2$ (ZIF-90), $Cu_2(PZDC)_2$ (4,4'-BPY) (CPL-2), [Cu(HFBBA)(phen)$_2$](H$_2$HFBBA)$_2$(H$_2$O)(HCO$_2$) (F-MOF-1), and $Cu_{24}(m-BDC)_{24}(DMF)_{14}(H_2O)_{10}$ (MOP-1), and most preferably a zeolite imidazole structure.

In the present invention, the carbonizing the MOF-coated electrode substrate to form a carbon layer containing a carbon defect structure may perform by evaporating metals and atoms other than carbon atoms without a secondary carbon source to thereby produce defective turbostratic carbon.

In the present invention, when the MOF is a zeolite imidazole structure, zinc (Zn) and nitrogen (N) are evaporated to produce defective turbostratic carbon. In the present invention, when the MOF is a zeolite imidazole structure, carbonization may be performed at 907° C. or higher, and carbonization is preferably performed by heating at 900 to 1500° C., most preferably by heating at about 1000° C.

In one embodiment of the present invention, the carbon felt was oxidized under an oxygen stream for hydrophilization and coated with MOF, and then the MOF-coated electrode substrate was carbonized by heating at 1000° C. for 1 hour and 5 hours. As a result of observing the carbonized electrode by X-ray diffraction analysis, a bumpy carbon skin was formed on the surface of the electrode that was carbonized for 1 hour, and the carbonized MOF-coated electrode has higher peak intensity at 2θ=25° than that of a noncarbonized MOF-coated electrode, which demonstrates that the carbonized electrode has a graphitic structure. On the other hand, the electrode carbonized for 5 hours comprises a web-like carbon layer formed thereon and has a decreased peak intensity at 2θ=25°, which indicates that the carbonized electrode contains a high-density defective carbon structure.

In the present invention, the method may further comprise oxidizing the electrode substrate before coating with MOF.

Therefore, in the present invention, the carbonizing the MOF-coated electrode substrate to form a carbon layer containing a carbon defect structure may be performed at 900 to 1500° C. for 3 to 7 hours, preferably at about 1000° C. for 5 hours or more.

As used herein, the term "carbon defect structure" means a carbon structure comprising a defect. The defect-free carbon structure generally has a hexagonal ring structure called "graphene". The carbon defect structure is changed from a hexagonal structure to a pentagonal, hexagonal or octagonal structure by deletion or rearrangement of carbon in a complete graphene structure. In addition, with regard to carbon bond orbitals, the C—C bond is destroyed due to defects, which may accompany a change from a sp2 orbit to a sp3 orbit. The term "carbon defect structure" can be used interchangeably with "defective carbon structure" in the present invention.

Figure 7:
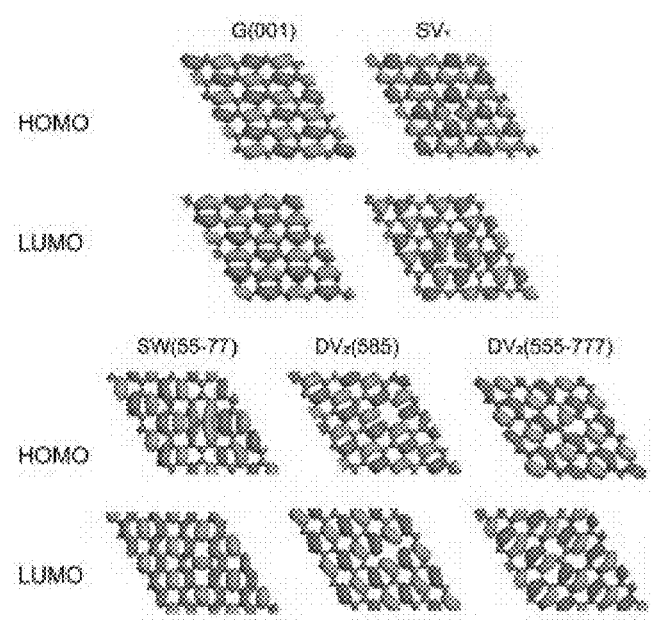
FIG. 7 shows the HOMO and LUMO of defect-free graphene and different defective carbon structures, wherein the electron density is expressed as an iso-value of 0.012 au, and red and green represent opposite signs.

The term "defect-free carbon structure" refers to perfect graphene having a hexagonal carbon ring structure as shown in FIG. 7, and generally known carbon defect structures comprise one type of single vacancy ($SV_1$), two types of double vacancies (($DV_2$ (585), $DV_2$ (555-777)) and Stone-Wales defects (SW (55-77)), but are not limited thereto.

In the present invention, the carbon defect structure may be characterized in that it is a single-vacancy defect.

As used herein, the term "single-vacancy defect" refers to a defect structure in which one carbon is lost or a plurality of carbons are deleted, and is a structure comprising a dangling bond formed by deletion.

In the present invention, the carbon defect structure may comprise a dangling bond.

As used herein, the term "dangling bond" refers to an immobile free radical that is present on the surface of an object when an atom cannot move, like a solid. In the present invention, "dangling bond" means an outermost electron when the outermost electrons of carbon atoms are not completely bonded due to deletion of carbon.

In the present invention, the rich and uniform dangling bonds formed in the defective carbon structure form abundant and uniform metal nuclei on the surface, and prevent self-aggregation and coalescence of metal adatoms and nuclei, thereby inhibiting the formation of dendrites and improving battery life and energy efficiency.

In the present invention, the electrode produced by the method above contains a single-vacancy defect at high density. The density of the single-vacancy defect is characterized in that a ratio (ID/IG) of a 1,350 $cm^{-1}$ band (D band) to a 1,585 $cm^{-1}$ band (G band), measured by Raman scattering, is 1 or more, preferably 1.1 or more, more preferably 1.4 or more, and may be 1.1 to 2.0, but is not limited thereto.

In the present invention, the electrode produced by the method above may contain the uniformly distributed carbon defect structure.

In the present invention, the electrode produced by the method above is characterized in that, in the charging/discharging cycling process, metal atoms are adsorbed and grown on the side surface of the single-vacancy defect, and thus are uniformly electrodeposited on the electrode and dissolved without forming dendrites.

The 1,350 $cm^{-1}$ band (D band, ID) is a band showing a defective carbon structure such as sp3 hybridized carbon when the carbon structure is measured by a Raman scattering method, and the 1585 $cm^{-1}$ band (G band, IG) shows the tangential stretching mode of high-purity pyrolysis carbon, and the ratio of the D band to the G band (ID/IG) represents the proportion of the defective carbon, and as the ratio increases, the density of the carbon defect structure increases. In the present invention, it was found that an electrode containing a high-density defective carbon structure can be produced based on various electrode substrates by coating with MOF on an electrode substrate and then carbonizing the electrode substrate to produce the electrode.

In one embodiment of the present invention, it was confirmed that the adsorption energy between the single-vacancy defect and the Zn adatom is about 3.26 eV, which is much greater than the adsorption energy between the Zn crystal plane and the Zn adatom, thereby preventing self-diffusion and aggregation of the Zn nucleus crystals and enabling zinc to be uniformly electrodeposited on the electrode surface.

As used herein, the term "electrode substrate" means a basis material on which a plating solution can be deposited in an electrodeposition process to produce an electrode. Preferably, the electrode substrate may be a conductive electrode, more preferably a carbon electrode, a metal electrode, an indium tin oxide (ITO) electrode, a fluorine tin oxide (FTO) electrode, or a glass plate comprising the same, but is not limited thereto.

In the present invention, the electrode substrate may comprise at least one selected from the group consisting of a carbon electrode, a metal electrode, indium tin oxide (ITO), and fluorine tin oxide (FTO).

In the present invention, the secondary battery may be a metal-based battery.

In the present invention, the metal may be characterized in that the adsorption energy between the metal crystal plane and the metal adatom is less than the adsorption energy between the metal adatom and the carbon defect structure, and the secondary battery is preferably a Zn-based battery.

Zinc (Zn) has been an ideal material in the field of chemical batteries since batteries first appeared due to characteristics such as high capacity (820 mAh/g), low electrochemical potential (0.762 V vs. standard hydrogen electrode (SHE)), high abundance, low toxicity and inherent safety in aqueous electrolytes. In particular, the Zn redox flow battery has great potential for application in industrial fields due to the high energy density and low material cost thereof.

Accordingly, in the present invention, the secondary battery may be a metal-based battery. In the present invention, the metal may be characterized in that the adsorption energy between the crystal plane and the metal adatom is smaller than the adsorption energy between the metal adatom and the carbon defect structure of the electrode, and the metal is preferably zinc (Zn).

The secondary battery may be a metal ion battery, a flow battery, or the like, and is preferably selected from the group consisting of a Zn air battery, a Zn ion battery, a Zn-halogen flow battery, a Zn—Fe flow battery, and a Zn—Ce flow battery.

In another aspect, the present invention is directed to an electrode produced by the method described above.

In yet another aspect, the present invention is directed to an electrode comprising a carbon layer containing a carbon defect structure on the surface of the electrode.

In the present invention, the carbon defect structure may have a single-vacancy defect structure.

In one embodiment of the present invention, it was found that an electrode comprising a carbon layer containing a high-density carbon defect structure on the surface of the electrode was produced, and in particular, when the electrode contained a single-vacancy defect structure, the formation of Zn dendrites was effectively suppressed even at a high current density of 100 mA cm$^{-2}$, and the Zn flow battery comprising the electrode exhibited excellent energy efficiency of 97% over 5000 cycles.

In another embodiment of the present invention, it was found that, when an electrode is produced by the production method described above, the electrode contains a defective carbon structure at a high density.

Therefore, the electrode according to the present invention contains single-vacancy defects at high density. The density of the single-vacancy defects may correspond to a ratio (ID/IG) of a 1,350 cm$^{-1}$ band (D band) to a 1585 cm$^{-1}$ band (G band), measured by Raman scattering, of 1 or more, preferably 1.1 or more, more preferably 1.4 or more, but is not limited thereto.

In the present invention, the single-vacancy defect structure of the electrode has 1.1 to 2.0 of a ratio (ID/IG) of a 1,350 cm$^{-1}$ band (D band) to a 1,585 cm$^{-1}$ band (G band), measured by Raman scattering.

In the present invention, the carbon defect structure is uniformly distributed on the carbon layer.

In yet another aspect, the present invention is directed to a secondary battery comprising the electrode produced by the method above or an electrode comprising a carbon layer containing a carbon defect structure on the surface thereof.

As used herein, the term "secondary battery" refers to a battery that can be used semi-permanently by charging with electricity generated in the process of causing oxidation/reduction reactions of materials between a cathode and an anode by a current supplied from an external power source.

In the present invention, the secondary battery may be a metal-based battery. In the present invention, the metal may be characterized in that the adsorption energy between the crystal plane and the metal adatom is smaller than the adsorption energy between the metal adatom and the carbon defect structure of 41 the electrode, and the metal is preferably zinc (Zn).

As can be seen from the embodiment of the present invention, when the adsorption energy between the adatom and the crystal plane is large, the metal nuclei and adatom move, aggregate and coalesce to form a dendrite. However, when the adsorption energy between the adatom and the crystal plane is smaller than the adsorption energy between the metal adatom and the carbon defect structure of the electrode, the metal nucleus and adatom neither aggregate nor coalesce, and grow on the side surface of the carbon defect structure, which is evenly distributed between the electrode surfaces, thus inducing uniform plating to thereby suppress the formation of dendrites and increase battery life and energy efficiency.

As used herein, the term "adatom" means an adsorbed atom, and in the present invention, the adatom is an atom of an electrolyte adsorbed on a cathode or an anode, and in one embodiment, the adatom is a metal atom adsorbed on the anode. In one embodiment of the present invention, the adatom is a zinc adatom (Zn adatom).

As used herein, the term "crystal plane" means "a plane of a crystal". In the present invention, a new mechanism of dendrite formation was confirmed, by which, when the adsorption energy between the metal crystal plane and the metal adatom is greater than the adsorption energy between the defective carbon structure and the metal adatom, self-diffusion and self-aggregation occur, thus causing formation of dendrites which reduce the lifespan and energy efficiency of the battery.

As used herein, the term "adsorption energy" means the energy between two adsorbed substances, and generally means the energy required to separate the two substances. In general, the adsorption energy is expressed as "$E_{ads}$" or "$E_{ad}$", and can be calculated by a calculation method or method known to a person skilled in the art, and is generally calculated as "(energy of element-adsorbed structure)−(structural energy of each element and structure)", but is not limited thereto. In an embodiment of the present invention, the adsorption energy ($E_{ads}$) between the zinc and carbon surfaces was calculated by the following formula:

$$E_{ads} = E_{Zn+Carbon\ surface} - E_{zn} - E_{Carbon\ surface}$$

In the present invention, the secondary battery may be selected from the group consisting of a Zn air battery, a Zn ion battery and a Zn-flow battery. For example, the Zn-flow battery is a Zn-based hybrid flow battery such as a Zn-halogen flow battery, a Zn—Fe based hybrid flow battery, or a Zn—Ce flow battery, but is not limited thereto.

The electrode of the present invention can be used as an anode in the secondary battery.

The secondary battery of the present invention exhibits a greater number of charge/discharge cycles and excellent energy efficiency through inhibition of dendrite formation at the anode.

In the present invention, the secondary battery has a coulombic efficiency of about 80% or more during about 500 or more charge/discharge cycles, preferably a coulombic efficiency of about 80% or more, preferably 85% or more, more preferably about 90% or more, and most preferably about 95% or more, preferably during about 1000 charge/discharge cycles, more preferably about 3000 charge/discharge cycles, and most preferably 5000 charge/discharge cycles.

Hereinafter, the present invention will be described in more detail with reference to examples. However, it will be obvious to those skilled in the art that these examples are provided only for illustration of the present invention and should not be construed as limiting the scope of the present invention.

Example

Materials and Methods

Synthesis of Electrodes

ZIF-8-coated carbon felt electrode (ZIF-8@CF): the surface of a carbon felt (CF, 3×2 cm$^2$) was oxidized under an O$_2$ gas stream at 520° C. for 9 hours to hydrophilize the carbon felt. After cooling to room temperature, the surface-oxidized CF was coated with ZIF-8. Specifically, each of zinc nitrate hexahydrate (5.95 g, 1 eq.) and 2-methyl imidazole (13.136 g, 8 eq.) was dissolved in 100 mL of methanol. A solution of $Zn^{2+}$ (15 ml) and 2-methyl imidazole (15 ml) was mixed for 12 hours. Then, the sample was thoroughly washed with ethanol to remove the residual solvent. The ZIF-8 coating procedure was repeated 9 times, and the resulting ZIF-8@CF was dried under vacuum at 60° C.

Carbonized electrode (CZ): The ZIF-8@CF was transferred to a vacuum oven, heated under a $N_2$ atmosphere at 5° C. per minute, and carbonized by heating at a carbonization temperature (1000° C.). CZ-1 was carbonized by heating for 1 hour, and CZ-5 was carbonized by heating for 5 hours. The resulting CZ was transferred to a beaker containing 2M HCl and stirred at room temperature for 6 hours. CZ was sequentially rinsed with distilled water and dried under vacuum at 70° C. for 6 hours.

Characterization of the Electrodes

The X-ray diffraction (XRD) was performed of 5.0 kV by a XRD system (model: D/MAX-2500) with the angle range from 10° to 90° with scanning rate of 5° min 1. TEM and HAADF-STEM images coupled with EDS were conducted on an FEI Talos F200x TEM at an acceleration voltage of 200 kV. The surface morphology of the deposits was analyzed by scanning electron microscopy (SEM) on an FE-SEM (Sirion, Netherlands). Raman spectra were obtained by using a WITec CRM200 confocal Raman microscopy system with a laser wavelength of 488 nm and a spot sized of 0.5 mm. The surface analysis of the sample has been carried out using the Thermo Scientific Theta Probe X-ray photoelectron spectroscopy (XPS).

Electrochemical Analysis

For accurately characterizing the electrochemical properties of three-dimensional felt electrode, a new type of electrochemical analysis cell was used, which proposed by J. H. Park et al 62. All chronoamperometry (CA), electrochemical impedance spectroscopy (EIS), galvanostatic deposition were conducted using a VSP device (Biologic science instruments). The Ag/AgCl electrode in saturated NaCl aqueous solution and a activated carbon felt (TOYOBO) were used as reference and counter electrode, respectively. The electrolyte used was 0.01 M $ZnBr2$, prepared using material from Sigma-Aldrich for chronoamperometry (CA) experiment. The electrochemical performances of the EDLCs were measured using electrochemical measurement device (VSP) from BioLogic science instruments. The CV was recorded for a stable potential window of 0-0.5 V for various scan rates (10-140 mV sec-1) at same electrolyte used in ZBB cycling test.

Battery Performance Test

Commercial carbon felt (SGL carbon group, Germany) with uncompressed thickness of 4 mm was used. The negative and positive area were both 6 $cm^2$, and they were separated by a SF-600 separator (Asahi). An electrolyte mixture (20 mL) of 2 M $ZnBr_2$+0.5 M $ZnCl_2$+4 $MNH_4Cl$+ 0.02 M N-ethyl N-methyl pyrrolidinium bromide (MEP) in deionized water was used for the flow cell testing. The catholyte and anolyte flow rate were adjusted to 50 mL/min.

Calculation of Density Functional Theory (DFT)

All density functional theory (DFT) calculations were performed with the program package DMol3 in Materials Studio from Accerlrys, Inc. Dmol3 uses numerical orbitals as basis functions, each of which corresponds to atomic orbitals. These works utilize a double-numericplus-polarization (DNP) function and a global orbital cutoff of 4.0 Å. The size of the DNP basis set is comparable to Gaussian 6-31G (d), but the DNP is more accurate than the corresponding Gaussian basis set. DFT calculations were performed with a gradient-corrected (GGA) functional with the Perdew-Bueke-Ernzerhof (PBE) exchange correlation functional. Tolerances of energy, gradient, and displacement convergence were 0.00001 hartree, 0.002 hartree/Å, and 0.005 Å, respectively. To avoid the interaction caused by the periodicity, a vacuum layer of 20 Å along the z-direction was used for calculations. The slab models were all built on the basis of a monolayer graphite (001) surface in a 3×3×1 supercell and 3×3×1 k-point. Monkhorst-Pack grids were adopted to the Brillouin zone. The force tolerances of self-consistent-field (SCF) cycles are $1.0 \times 10^{-6}$. The Grimme's DFT-D2 method was adopted to account for the van der Waals interactions (vdW), and this method was optimized for several DFT functionals. The adsorption energies of Zn on different carbon surfaces were calculated as follows:

$$E_{ads} = E_{Zn+Carbon\ surface} - E_{Zn} - E_{Carbon\ surface}$$

$E_{Zn}$+Carbon surface and $E_{Carbon\ surface}$ refer to the total DFT energy of different carbon surfaces having or not having Zn atoms adsorbed thereon, and $E_{Zn}$ refers to the energy of Zn obtained from an isolated atom.

Example 1: Production of Electrode

In order to increase the density of the defective carbon structure of the electrode, a metal-organic framework (MOF) was used as a precursor of the defective carbon, and the carbon felt as an electrode substrate was oxidized, coated with MOF and carbonized to produce an electrode.

Various MOFs could be used to generate a high-density defective carbon structure, and among them, a zeolitic imidazole framework (ZIF) was selected. Zeolitic imidazole contains Zn and N atoms, but Zn and N atoms are removed without a secondary carbon source when carbonized at a temperature of about 1,000° C. or more in consideration of the boiling point of each atom, to produce defective turbostratic carbon. Carbon felt (CF) was coated with ZIF-8 using a solution-coating method in a mixed solution of zinc nitrate hexahydrate and 2-methyl imidazole, and ZIF-8-coated CF (ZIF-8@CF) was carbonized at about 1000° C. to evaporate Zn and N to produce an electrode (CZ) containing a high-density defective carbon structure (Zn boiling point of about 907° C.).

Example 2: Electrode Surface Morphology Analysis

Figure 2:
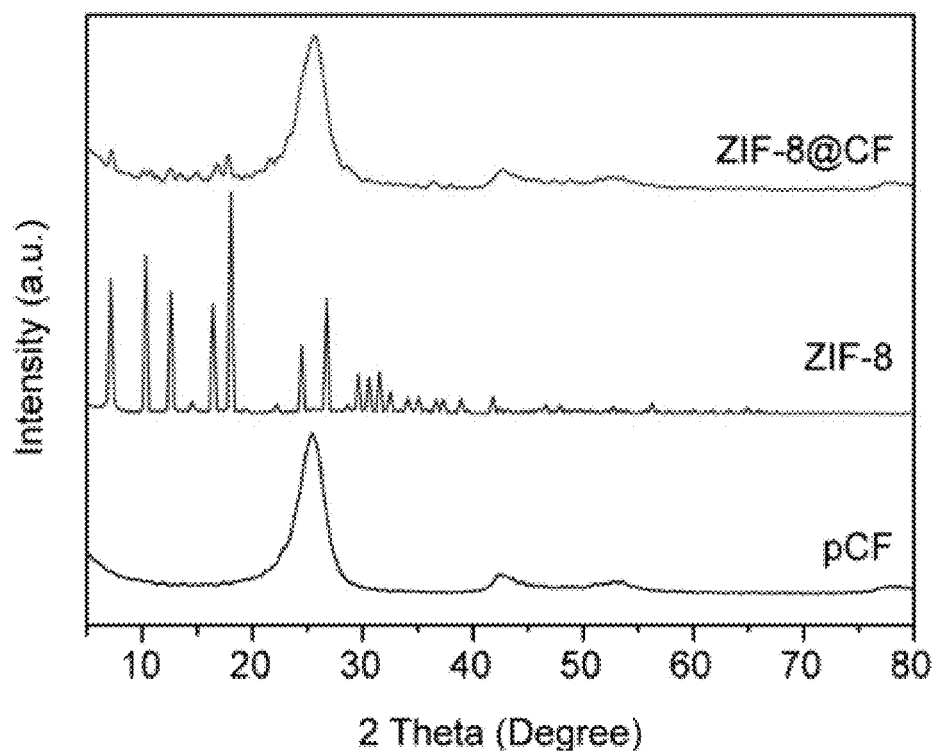
FIG. 2 shows results of powder X-ray diffraction (PXRD) of pCF, ZIF-8 and ZIF-8-coated carbon felt (ZIF-8@CF), wherein PXRD represents the ZIF-8-coated surface of pCF, pCF does not exhibit peaks associated with ZIF-8, whereas the ZIF-8@CF electrode exhibits diffraction peaks at 7.2, 10.2, 12.5, 16.0 and 17.7°, at which (110), (200), (211), (310), and (222) diffraction peaks are shown, which means that ZIF-8 crystals were successfully grown in pCF.
Figure 3:
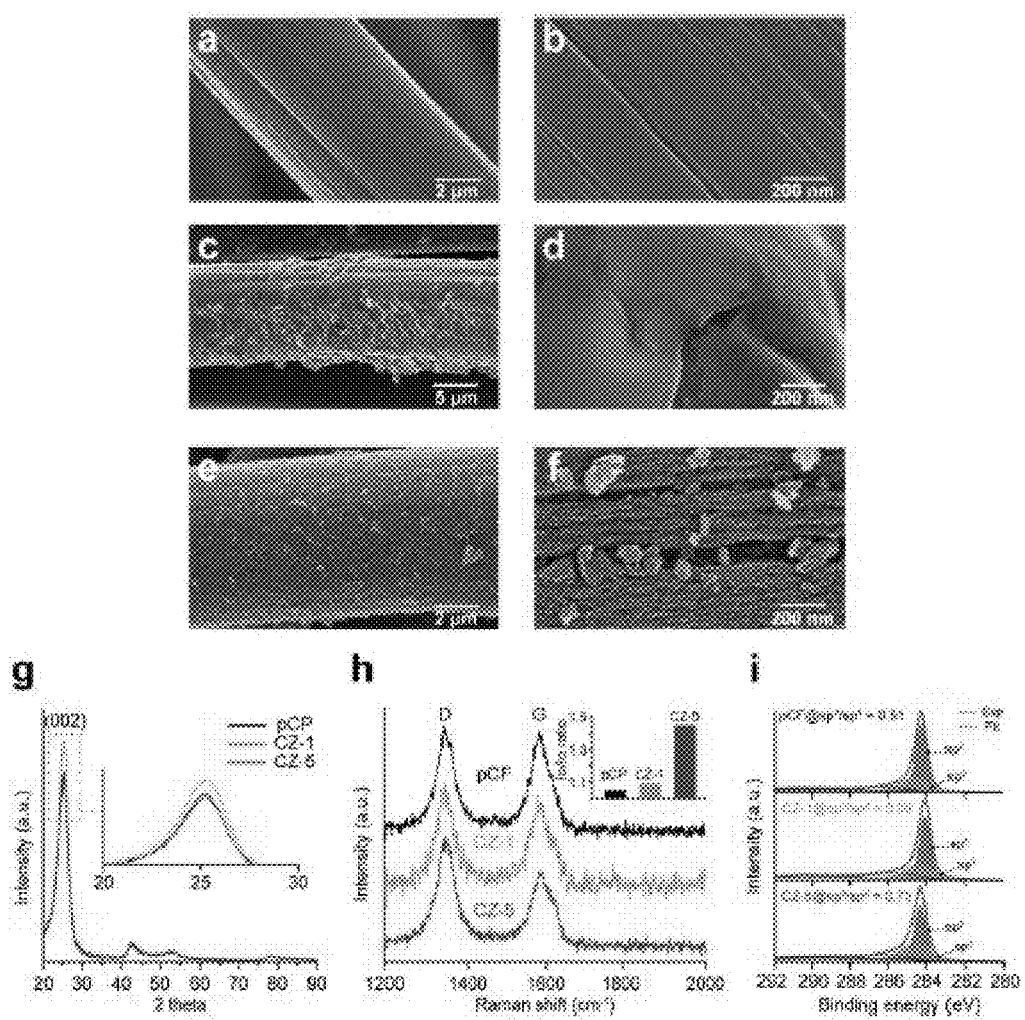
FIG. 3 in (a) and (b) shows SEM images at various magnifications showing pCF electrodes, in (c) and (d) shows SEM images at various magnifications showing the CZ-1 electrode, in (e) and (f) shows SEM images at various magnifications showing the CZ-5 electrode, in (g) shows an XRD pattern for each electrode, in (h) shows a Raman spectrum for each electrode, and in (i) shows the result of high-resolution XPS for each electrode.
Figure 4:
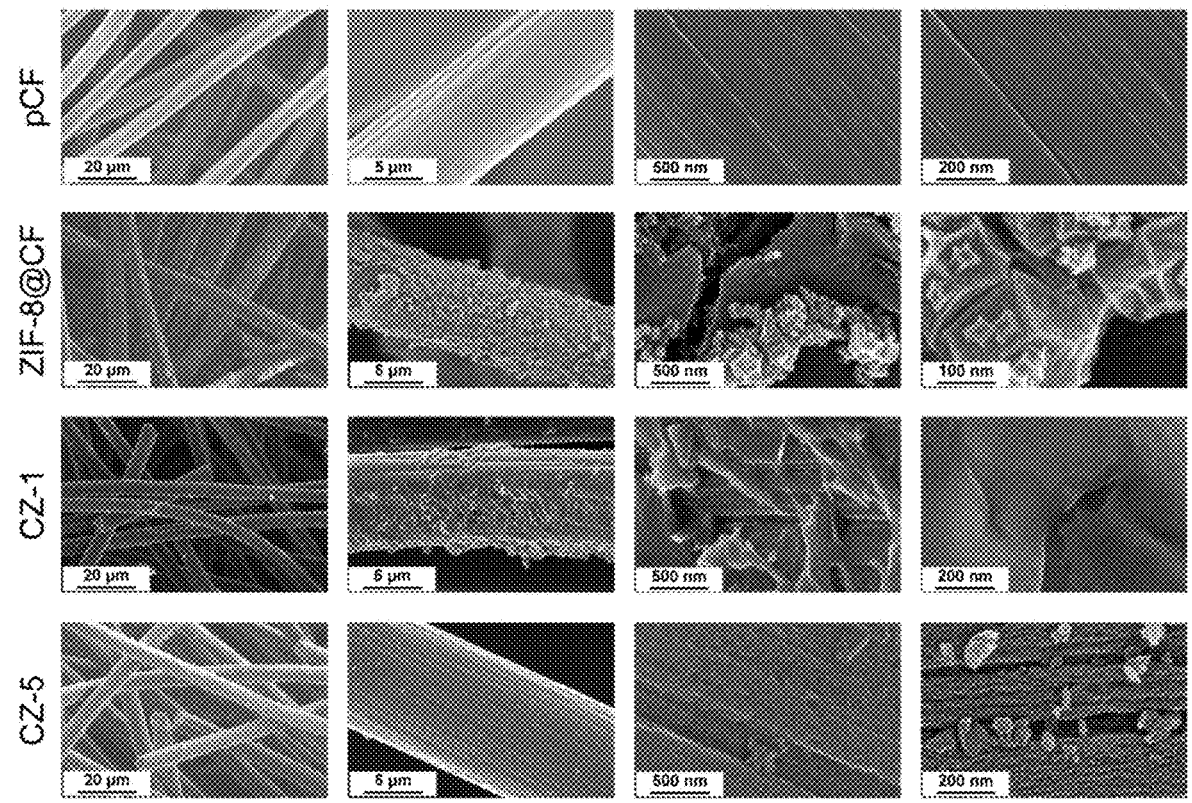
FIG. 4 is a high-magnification SEM image showing pCF, ZIF-8@CF, CZ-1 and CZ-5 electrodes.

In order to compare and analyze the effect of the defective carbon structure generated over time, a CZ-1 electrode carbonized for 1 hour and a CZ-5 electrode for 5 hours were prepared. The pattern of Zn growth and the formation of dendrites in the carbon felt (pristine CF; pCF) and the prepared electrodes (CZ-1 and CZ-5) are shown in FIG. 1. The smooth surface of carbon felt (pCF) was uniformly covered with ZIF-8 nanocrystals having a hexagonal structure to form ZIF-8@CF. The growth of ZIF-8 particles on the carbon felt was confirmed by powder X-ray diffraction analysis (FIG. 2). The diffraction peaks at 7.2, 10.2, 12.5, 16.0, and 17.7° detected for ZIF-8@CF correspond to (110), (200), (211), (310) and (222) planes of ZIF-8, respectively. After carbonization, the surface of CZ-1 comprises an uneven carbon skin formed on CF, which suggests that a smooth carbon skin of CF with fewer defects evolved (FIG. 3 in (c) and (d)). As the carbonization time increased from 1 hour to 5 hours, the coverage of the carbon felt by the carbon layer increased to form a web-like carbon layer, which shows the spread of the carbon layer on the CF surface due to the π-π interaction between CF and carbonized ZIF-8 particles during the carbonization process (FIGS. 3 and 4). The crystal structures of pCF, CZ-1 and CZ-5 were analyzed by X-ray diffraction (XRD) (FIG. 3 in (g)). The strongest and sharpest reflection peak at 2θ=25° generally represents the (002) reflection of the graphite structure of carbon. As a result, in the XRD spectrum, in the case of CZ-1, the highest peak intensity can be observed at 2θ=25°, which means a high-graphitic carbon structure produced by carbonization of ZIF-8. In the XRD pattern of CZ-5, the intensity at 2θ=25° was decreased compared to pCF, which was due to the formation of a high-density defective carbon structure (FIG. 3 in (g)).

Raman spectra of the pCF, CZ-1, and CZ-5 electrodes indicate the density of the defective carbon structure of each electrode (FIG. 3 in (h)). The D band at 1,350 cm$^{-1}$ is attributable to a defective carbon structure such as sp3-hybridized carbon, and the G band at 1,585 cm$^{-1}$ is due to the tangential stretching mode of high-purity pyrolytic graphite. Therefore, the intensity ratio of the D and G bands (ID/IG) represents the defect density of the carbon structure. The ID/IG ratio was 1.05 for pCF, 1.09 for CZ-1, and 1.45 for CZ-5. This means that a high-density carbon defect structure was formed in the ZIF-8-derived carbon layer during heat treatment at 1,000° C. for 5 hours. On the other hand, the ID/IG of CZ-1 did not significantly increase compared to pCF, which is consistent with XRD spectra.

Figure 5:
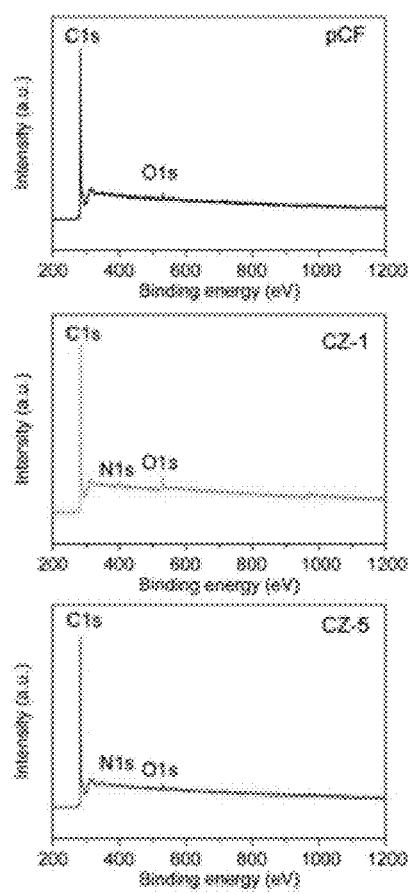
FIG. 5 shows the results of representative elemental XPS measurements of pCF, CZ-1 and CZ-5 electrodes, wherein the XPS spectrum shows a very low N content of 2.41% for CZ-1 and 1.21% for CZ-5, and Zn shows no signal, which means that N and Zn were removed during the carbonization process.

Then, the formation of defects on the CZ electrode was further confirmed through X-ray photoelectron spectroscopy (XPS) analysis. The C1s spectrum (FIG. 3 in (i)) showed four peaks at 284.1±0.1 (sp2 carbon), 284.3±0.1 (sp3 carbon), 285.7±0.2 (C—O) and 289.7±0.4 eV (C═C). The conversion from graphite to the defective carbon structure involves a change in orbital from sp2 to sp3 due to C—C bond breakage and formation of single-vacancy defects. The intensity ratios of sp3/sp2, indicating the density of the defective carbon structure, were 0.51, 0.59 and 0.73 for pCF, CZ-1 and CZ-5, respectively. However, like the ID/IG value in the Raman spectrum, there was no significant difference in the sp3/sp2 intensity ratio between pCF and CZ-1, which is consistent with the results of XRD. The above results mean that CZ-1 has a highly aligned graphite carbon surface. In addition, the XPS survey spectrum of FIG. 5 shows the content of oxygen and nitrogen atoms other than carbon, wherein CZ-1 had N content of 2.418, CZ-5 had N content of 1.11%, and Zn had no signal, so N and Zn were removed (FIG. 5). Based on the above analysis, CZ-1 and CZ-5 are determined to be electrodes having high graphite carbon and high-density carbon defect structures, respectively.

Example 3: Density Functional Theory (DFT) Calculation: Analysis of Influence of Carbon Defects on Adsorption and Surface Diffusion of Zn Adatom In order to establish a basic understanding of the effects of defect structures on Zn adsorption and surface diffusion, the present inventors have conducted the first principle calculation based on the density functional theory (DFT) regarding adsorption energies ($E_{ads}$) of perfect graphene and Zn adatom with typical carbon defects. Five typical types of carbon structures were considered; 1) perfect graphene (G(001)), single-vacancy defects ($SV_1$), 2) Stone-Wales defects, SW (55-77), and 3, 4) two double-vacancy defects (($DV_2$ (585) and $DV_2$ (555-777)) (FIG. 6 in (a)). Due to the tendency to reorganize the hexagonal ring without removing or adding atoms, the carbon defect structure converges to one of the above five structures. A single-vacancy defect, which is the simplest defect having one defective lattice carbon, may have one dangling bond ($SV_1$). The Stone-Wales defect consists of two heptagonal structures and two pentagonal structures (SW(55-77)). The two double-vacancy defect structures may be formed by removing a CC dimer from perfect graphene (a defect-free carbon structure), or by coalescence of two single-vacancy defects, and one of them is composed of two pentagonal structures and one octagonal structure ($DV_2$ (585)), and the other has three pentagons and three heptagons ($DV_2$ (555-777)). Perfect graphene having a (001) crystal plane was used as a control group.

Figure 6:
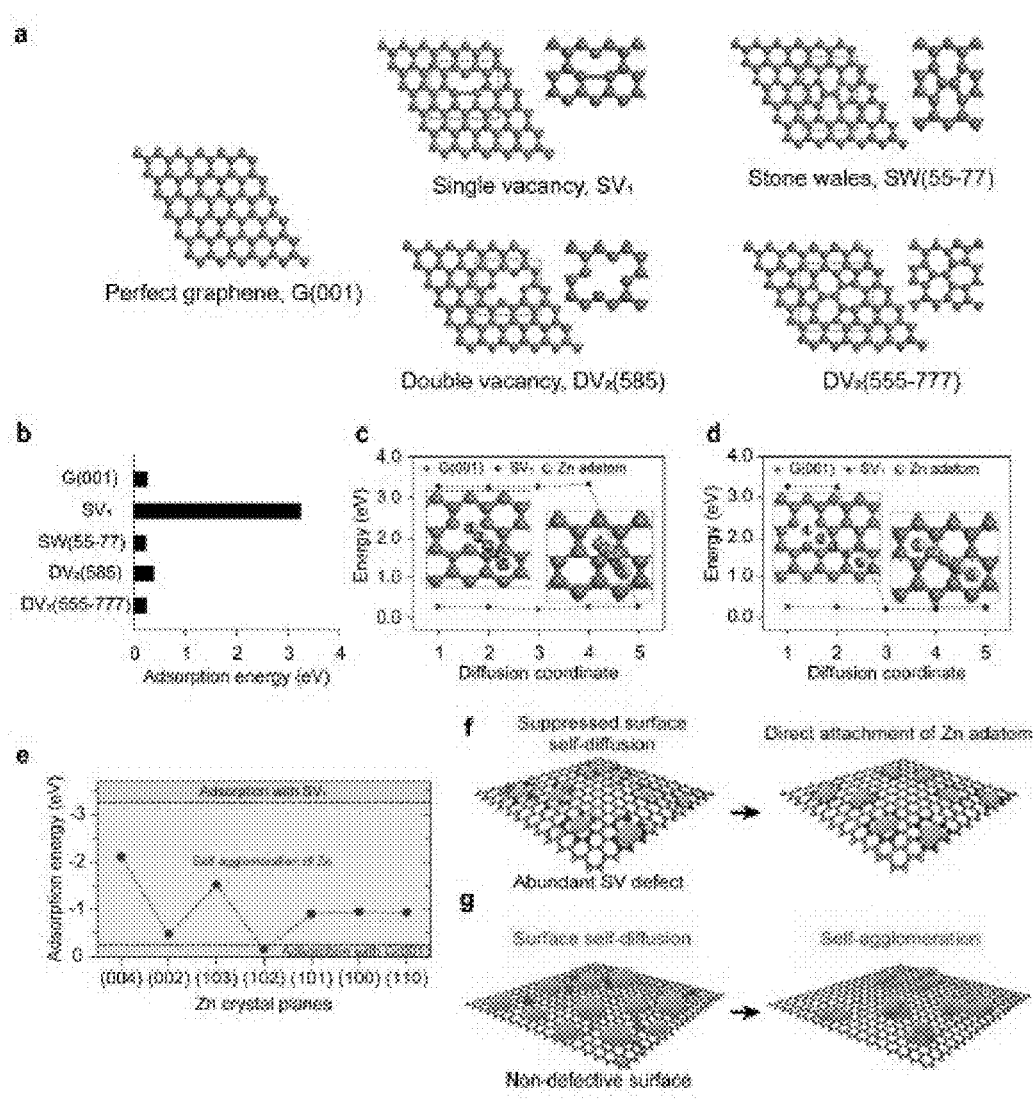
FIG. 6 in (a) shows perfect graphene and a defective carbon structure for DFT analysis, in (b) shows a comparison in adsorption energy between perfect graphene and various types of carbon defects and Zn adatoms, in (c) and (d) shows changes in the Zn energy profile when a Zn atom moves across or along a C—C bond on the surface of the $SV_1$ defective carbon, in (e) shows a comparison in adsorption energy between different Zn crystal planes (red dots), $SV_1$ (blue dots) and G(001) (green dots) surfaces, and Zn adatoms, in (f) schematically shows the stepwise formation and growth of Zn nuclei in the carbon layer containing the $SV_1$ defect, and in (g) schematically shows the surface self-diffusion and aggregation of the Zn adatom and nuclei.
Figure 8:
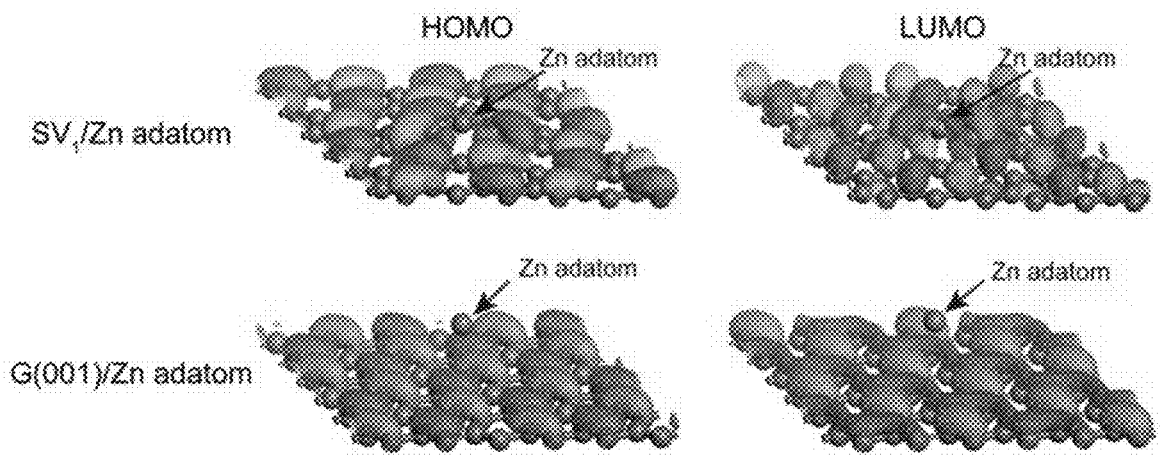
FIG. 8 shows the HOMO and LUMO of G(001) and $SV_1$, having a Zn adatom complex, wherein the electron density is expressed as an iso-value of 0.012 au, and red and green represent opposite signs.
Figure 9:
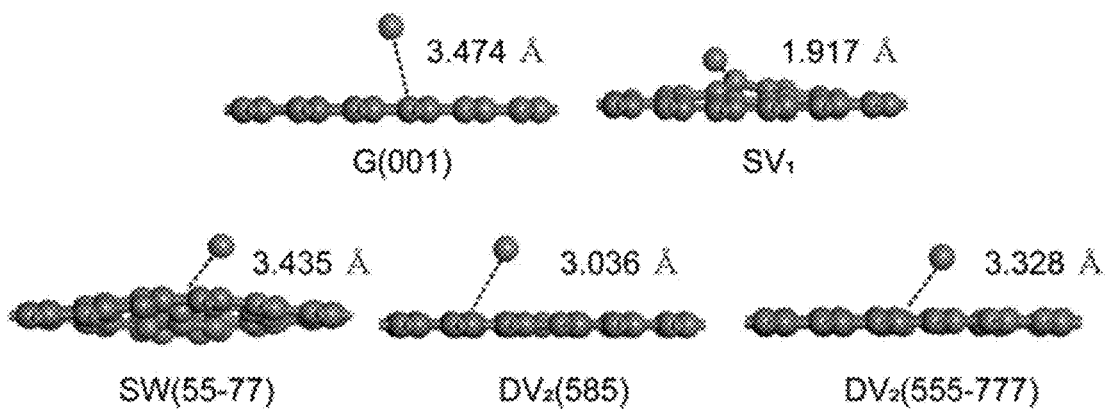
FIG. 9 shows an optimized atomic structure that interacts with Zn adatoms of defect-free graphene and various defective carbon structures.

As shown in FIG. 7, since only the $SV_1$ defect is locally concentrated around the defects and has a malformed electronic structure, electron transfer between the defect and the Zn adsorbent can be realized. FIG. 6 in (b) shows the adsorption energies ($E_{ads}$) of the Zn adatom with the perfect graphene and five defective graphene surfaces. $E_{ad}$ (3.26 eV) of $SV_1$ is much greater than the $E_{ad}$ of G(001) (0.27 eV) and other defects (SW (SW(55-77): 0.24 eV; $DV_2$ (585): 0.24 eV; $DV_2$ (555-777): 0.25 eV)), indicating that $SV_1$ is the strongest adsorption site. The above result corresponds to the results regarding the orbital hybridization between the Zn atom and $SV_1$ (FIG. 8) and the shortest distance between the Zn atom and $SV_1$ (FIG. 9).

In order to prevent the self-aggregation of the Zn adatom and small nuclei, it is important to calculate the energy for the surface diffusion of the adsorbed Zn in the $SV_1$ defect. In general, there are considered to be two orbits of Zn adatom movement from the defect center to the adjacent hexagonal center, namely 1) an orbit across the midpoint of the C—C bond, and 2) an orbit along the C—C bond, on the $SV_1$ and G(001) surfaces. $E_{ad}$ was calculated to quantify the barrier to movement at five sites on the orbits shown in FIG. 6 in (c) and (d). As shown in FIG. 6 in (c) and (d), when the Zn adatom deviates from the $SV_1$ defect for both paths, the adsorption energy significantly decreases. The difference between the maximum adsorption energy and the adsorption energy at the center of the hexagon corresponds to the energy barrier to diffusion. The energy barrier is 2.986 eV for migration across C—C bonds and 3.046 eV for migration along C—C bonds, which are much greater than G(001) (0.07 eV) (FIG. 6 in (c) and (d)). This result means that the Zn adatom adsorbed at the $SV_1$ binding site is difficult to aggregate.

Figure 10:
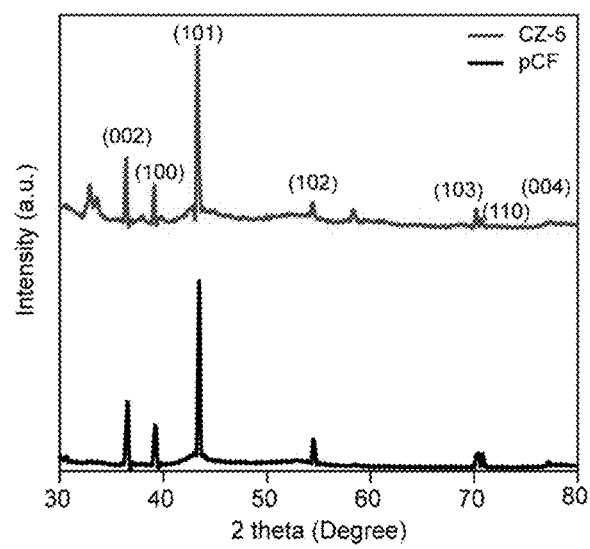
FIG. 10 shows the XRD pattern of Zn electrodeposited on pCF and CZ-5 electrodes for 1.2 minutes at 100 mA $cm^{-2}$.
Figure 11:
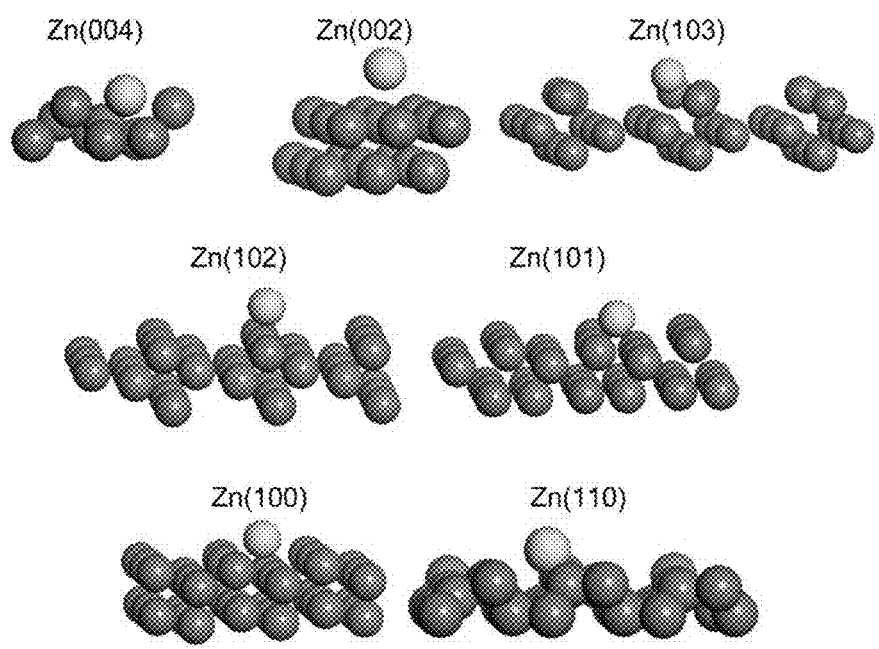
FIG. 11 shows a DFT simulation of a Zn adatom having various crystal planes, wherein adsorption energies of all Zn crystal planes observed in Zn-electrodeposited pCF and CZ-5 electrodes and Zn adatom (yellow) were computer-simulated.

The relative intensity of the adsorption energy between the $SV_1$ defect or the Zn crystal plane and the Zn adatom affects the nucleus formation/growth mode. When the absorption energy between the Zn crystal plane and the Zn adatom is relatively small, the transfer of the Zn adatom from the $SV_1$ defect to the already formed Zn nucleus is thermodynamically impossible, so uniform Zn nucleus formation/growth can be achieved in the $SV_1$ defect. Conversely, when the absorption energy for the Zn crystal plane is larger, Zn electrodeposition occurs preferentially in the formed Zn nucleus, rather than in the $SV_1$ defect, causing localized Zn electrodeposition in the initially formed nucleus. DFT calculations were performed for all Zn crystal planes observed in the XRD pattern of Zn electrodeposits on pCF and CZ-5 electrodes (FIGS. 10 and 11). As shown in FIG. 6 in (e), the $E_{ads}$ for the various Zn crystal planes are much smaller than the $E_{ads}$ for $SV_1$ (blue dotted line), but are larger than the $E_{ads}$ for G(001) excluding the Zn(102) plane (red dotted line). Obviously, due to the strong adsorption energy and the large energy barrier to diffusion, the $SV_1$ defect prevents self-aggregation of Zn (FIG. 6 in (f)), but remarkable Zn aggregation through surface diffusion is observed on a defect-free graphene surface (FIG. 6 in (g)). Almost no self-surface diffusion of nano-sized Zn nuclei and nanoscale clusters was observed in the electrochemical metal growth, but, when the lattice parameter mismatch between the substrate and the nucleus was large, the nano-sized Zn nuclei and nano-clusters can coalesce to a larger size, like adatoms. This aggregation mechanism of the adatom and nucleus is caused by a thermodynamic driving force enabling the surface energy to change into a stable form having the lowest surface energy. In addition, the calculation of DFT for the Zn adatom can represent the surface diffusion behavior of nano-sized nuclei. Based on the theoretical calculation method, it was confirmed that the $SV_1$ defects can realize uniformly distributed nucleation and suppress self-surface diffusion of Zn nuclei and adatoms, which further regulates the growth of Zn at the generation site.

Figure 12:
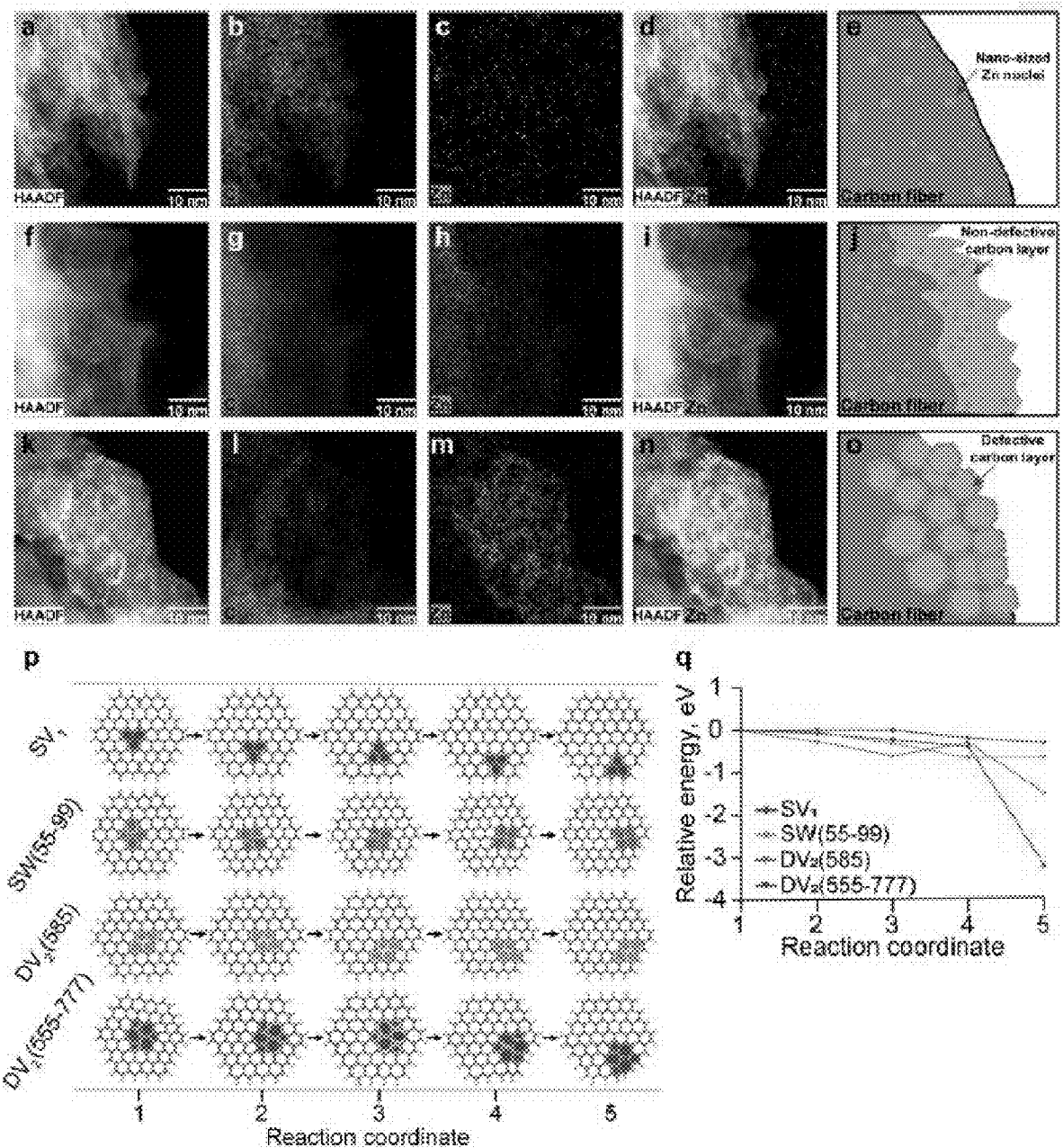
FIG. 12 in (a) to (o) shows schematic diagrams showing a Zn nucleus formation process in each of pCF, CZ-1 and CZ-5 electrodes, and HAADF-STEM and EDS mapping images showing electrodeposited Zn nuclei, wherein the same electrolyte used in a full-cell test was electrodeposited at 100 mA $cm^{-2}$ for 30 seconds (carbon (C) is blue, Zn is orange), with FIG. 12 in (a) to (e) showing HAADF-STEM and EDS mapping images showing Zn nuclei electrodeposited on the pCF electrode, with FIG. 12 in (f) to (j) showing HAADF-STEM and EDS mapping images showing the Zn nuclei electrodeposited on the CZ-1 electrode, and with FIG. 12 in (k) to (o) showing HAADF-STEM and EDS mapping images showing the Zn nuclei electrodeposited on the CZ-5 electrode.
Figure 13:
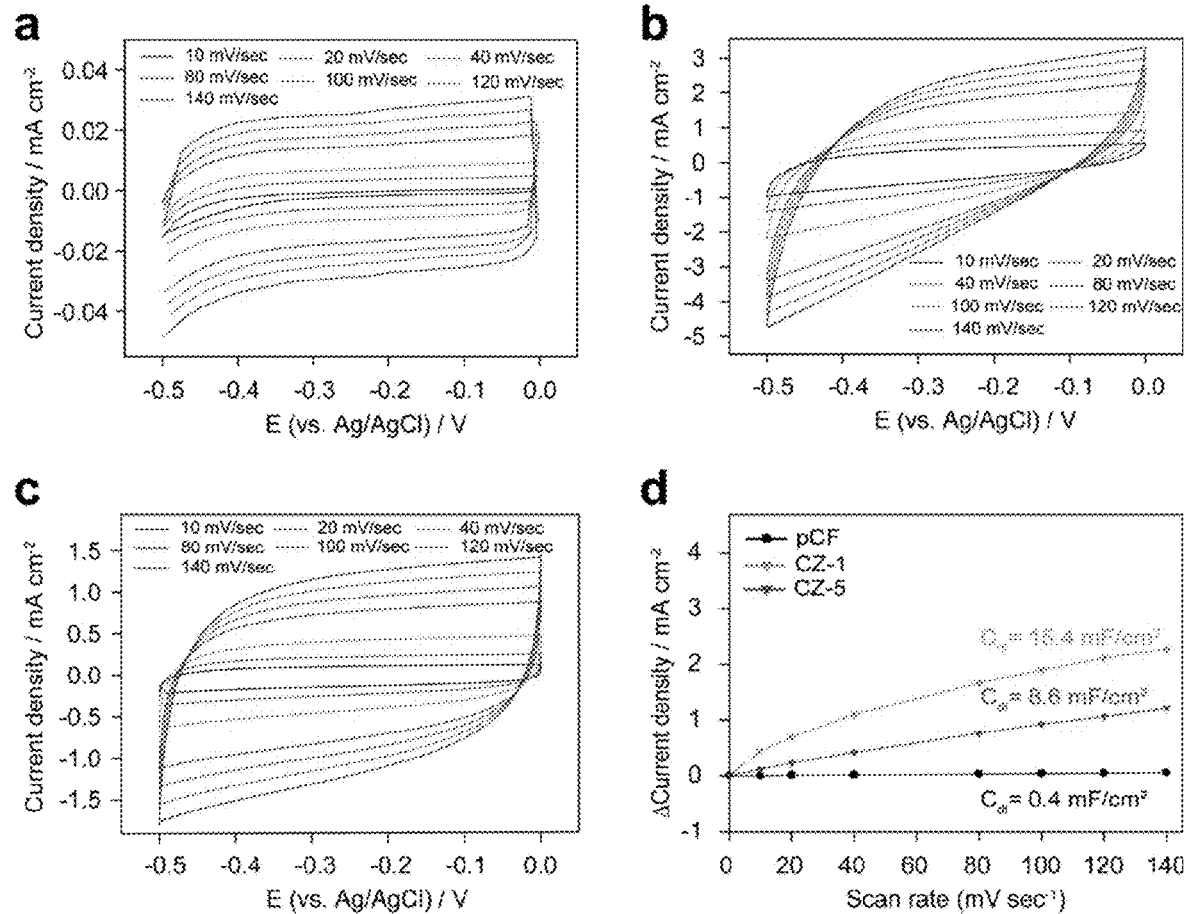
FIG. 13 shows the result of electrochemical double-layer capacitance (EDLC) analysis, with FIG. 13 in (a) showing the result of cyclic voltammetry (CV) of the pCF electrode scanned in a range of 0V to –0.5V at various scan rates, with FIG. 13 in (b) showing the result of CV of the CZ-1 electrode scanned in a range of 0V to –0.5V at various scan rates, with FIG. 13 in (c) showing the result of CV of the CZ-5 electrode scanned in a range of 0V to –0.5V at various scan rates, and with FIG. 13 in (d) showing linear fitting at the capacitive currents of pCF, dCF, CZ-1 and CZ-5 electrodes (capacitance=current/voltage conversion rate).
Figure 14:
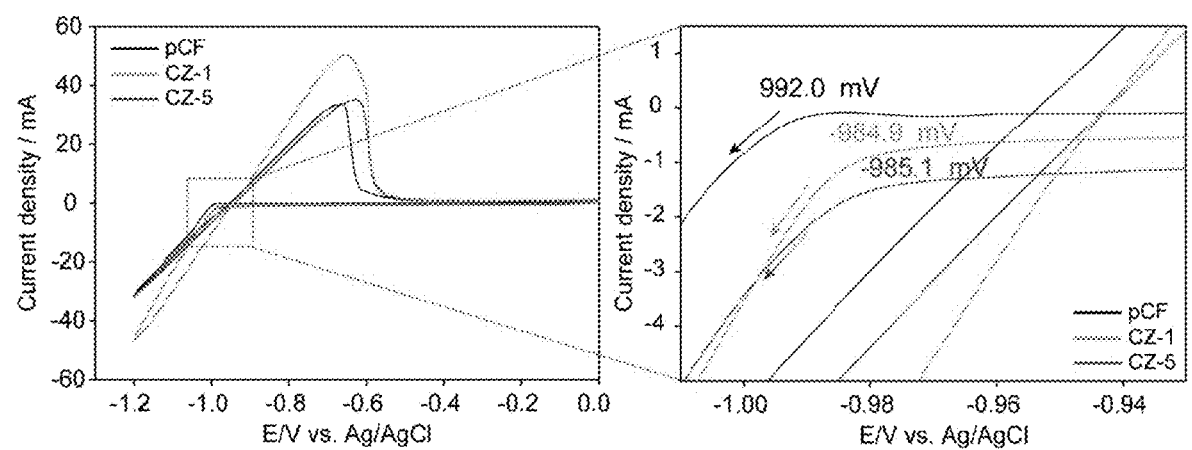
FIG. 14 shows the result of cyclic voltammetry (CV) for pCF, CZ-1 and CZ-5, wherein the anode current rapidly increases, and wherein the corresponding potential corresponds to the electrodeposition potential (DP) of the pCF, CZ-1 and CZ-5 electrodes in the same $ZnBr_2$ electrolyte as used in the full-cell test.

Example 4: Analysis of Zn Electrodeposition Mechanism and Morphology in Electrode Containing Defective Carbon Structure The preferred growth of Zn in the defective carbon layer was confirmed by ex-situ high-angle annular dark-field scanning transmission electron microscopy (HAADF-STEM) and energy dispersive spectroscopy (EDS) mapping corresponding thereto. Nanometer-scale observation was impossible in the already grown portion of the micrometer-sized Zn metal. The nanoscale nuclei of Zn formed at other sites were identified by EDS mapping and HAADF-STEM. As shown in FIG. 12, in (a) to (d), it was observed that Zn nuclei in pCF were sparsely formed with a low particle density, and that randomly distributed Zn nuclei did not have a specifically pre-determined nucleation site having high adsorption energy due to the presence of Zn nuclei and adatoms. In contrast, the rich formation of Zn nuclei was observed in the defective carbon layer of CZ-1. It should be noted that it was possible to grow the rich Zn nuclei of the CZ-1 electrode because the effective current density was reduced by an electrical double-layer capacitance of 15.4 mF/cm$^2$, which is greater than the capacitance (0.4 and 8.6 mF/cm$^2$) of the pCF and CZ-5 electrodes (FIG. 13). The characteristic voltage profile for the electrodeposition of 10 mA/cm$^2$ of Zn to the other electrode after iR-compensation was confirmed. The nucleation overpotential ($\eta$) of 1.142 V for CZ-1 was much lower than the nucleation overpotential (1.145 V and 1.124 V) for CZ-5 and pCF, which means that the increased surface area of CZ-1 produces Zn deposits more effectively than pre-defined nucleation sites such as the defective carbon layer of CZ-5. Consistent therewith, in cyclic voltammetries (CVs), the CZ-1 electrode had a low Zn electrodeposition potential of −984.9 mV, whereas pCF and CZ-5 had a decrease in electrodeposition potential of −992.0 and −985.1 mV according to the tendency of EDLC and n in galvanostatic electrodeposition, respectively (FIG. 14). In contrast, since the Zn nuclei were mainly electrodeposited on the defective carbon layer, when EDS mapping was performed only on the carbon element on CZ-5, no coated defective carbon layer was detected (FIG. 12, in (m) and (n)). This means that the embedded nanometer-scale Zn nuclei grew only in the bound carbon layer of CZ-5 due to the high adsorption energy of the defective carbon layer, as predicted by the DFT calculation. FIG. 12, in (e), (j) and (o) are schematic cross-sectional views showing Zn electrodeposited on pCF, CZ-1, and CZ-5 electrodes according to STEM imaging results. The CZ-1 sample exhibits a relatively rich and uniform Zn metal topography in early stages. In contrast, the putative edge growth of Zn nuclei along the defective carbon layer of CZ-5 has the same meaning as the effect of the defect on inhibition of self-aggregation of Zn.

Figure 15:
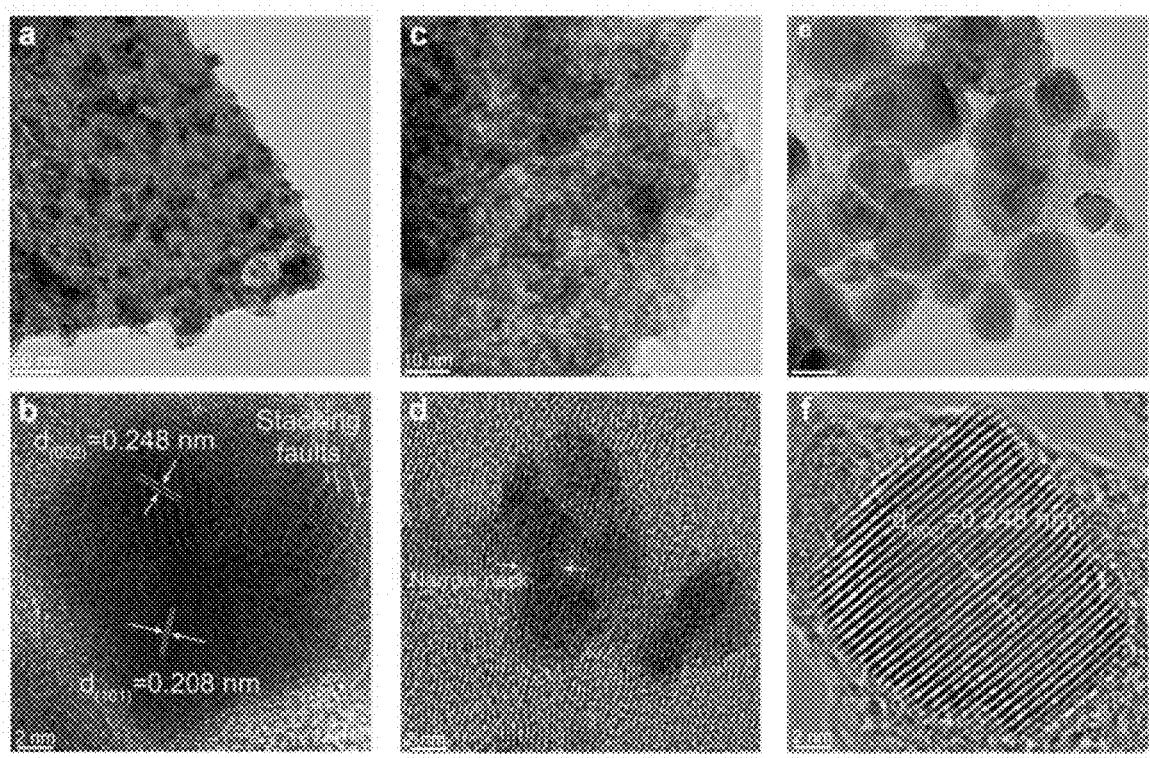
FIG. 15 is a representative HRTEM image showing Zn electrodeposited on each of pCF, CZ-1 and CZ-5 electrodes, wherein all samples were electrodeposited at 100 mA $cm^{-2}$ for 30 seconds, with FIG. 15 in (a) and (b) showing aggregated Zn nuclei having stacking faults in the pCF electrode, with FIG. 15 in (c) and (d) showing spherical projections connected through a narrow neck showing some domains having different crystallographic orientations observed in the aggregated Zn nanoclusters in the CZ-1 electrode, and with FIG. 15 in (e) and (f) showing single-crystal Zn particles in the CZ-5 electrode.

Local Zn nucleation at the edges of the carbonized ZIF-8 particles suggests the possibility of migration of the $SV_1$ defect to the edges. Recent reports support the notion that carbon defects are not always fixed and can move parallel to the graphene planes while mitigating strain caused by distortion around the defects. In particular, migration of $SV_1$ defects is known to occur at 100-200 (ACS Nano, 2010, 5, 26-41; Chemical Physics Letters, 2006, 418, 132-136). To verify this, DFT calculations were performed for the mitigation of other defects from the inside of the graphene to the edge (FIG. 12 in (k)). In the case of the $SV_1$ defect, the relative energy at the edge (relative energy=initial formation energy (Diffusion path 1)−intermediate formation energy) is significantly lower than the internal energy by −3.25 eV (FIG. 12 in (q)). However, other defects were found to have no significant energy difference between center and edge (SW (55-77): −0.70 eV, $DV_2$ (585): −1.54 eV, $DV_2$ (555-777): −0.36 eV) (FIG. 15).

Figure 16:
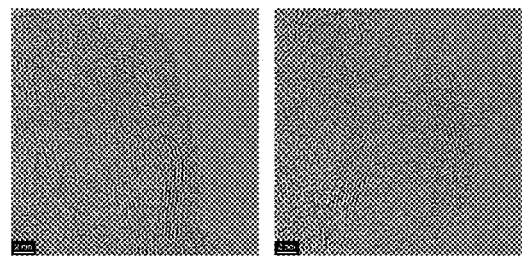
FIG. 16 is a STEM image showing pCF.

Therefore, there is a high possibility that the $SV_1$ defect formed in the heat treatment process will migrate to the surface, resulting in a defect-rich surface. In contrast to HAADF-STEM, as shown in FIG. 15, it was possible to obtain the actual size and lattice pattern of the electrodeposited Zn nanoparticles through high-resolution TEM (HR-TEM) measurement. Prior to the electrodeposition of Zn, observation of pCF reveals the (completely disordered) turbostratic structure of FIG. 16. FIG. 15 in (a) shows the aggregated Zn nuclei sparsely distributed on the pCF electrode. As shown in FIG. 15 in (b), it can be seen through a more detailed observation of one nanocluster that a polycrystalline structure having stacking fault and twinning, Zn (101) plane and Zn (002) plane, which have a crystalline domain size ranging from 15 to 20 nm, coexisted with a larger nanostructure. This morphology indicates nanocluster-aggregation-mediated growth in electrochemical electrodeposition and colloidal synthesis. Similarly, in the case of CZ-1 (FIG. 15 in (c) and (d)), many spherical Zn aggregations can also be observed from the electrode, and, as highlighted in FIG. 15 in (c), most aggregated Zn is connected with the remaining part of the body through a narrower neck. Although the lattice pattern cohesively extends through the large Zn domain on CZ-1, it is clear that different crystallographic orientations coexist within the same particle. Thus, this clear evidence, comprising polycrystalline nanoclusters of Zn, lamination defects and narrow necks observed in pCF and CZ-1, suggests that coalescence and aggregation growth interfere with uniform electrodeposition. However, when Zn is electrodeposited on the CZ-5 electrode, the Zn nuclei exist separately from each other, and have a single crystal like the Zn (002) plane (FIG. 15 in (e) and (f)). The above results strongly demonstrate that inhibition of surface diffusion of Zn adatoms and nuclei by $SV_1$ defects on the CZ-5 electrode can control the initial nucleation mode.

Figure 17:
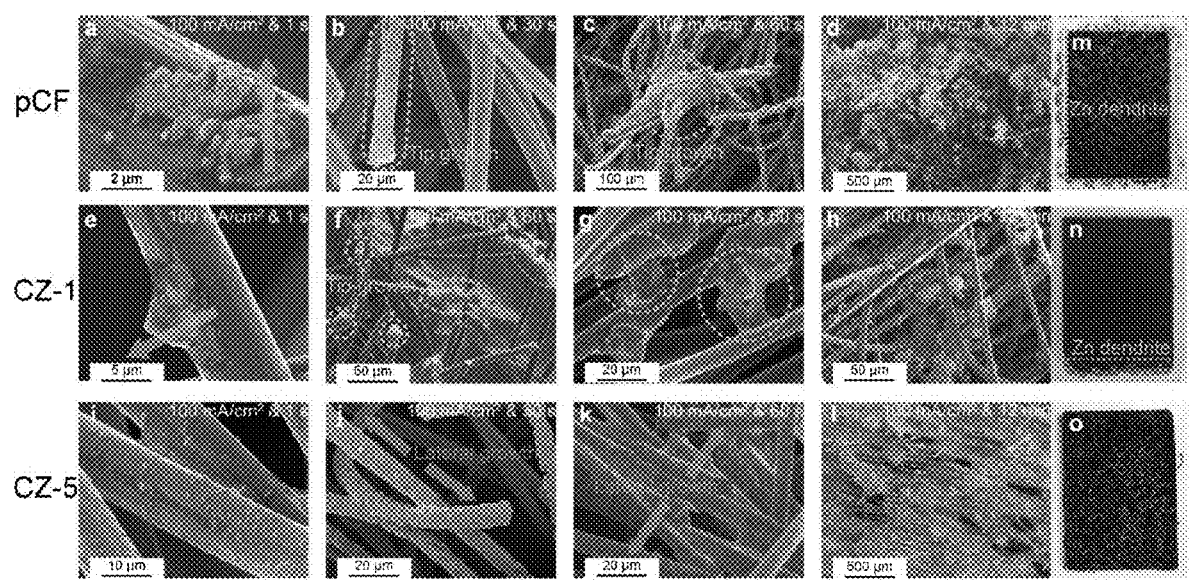
FIG. 17 in (a) to (o) shows the form of Zn metal plating on each electrode, wherein SEM images after electrodeposition for 1 second, 30 seconds, 60 seconds and 12 minutes, and images showing the corresponding electrodes assembled with SF600 separator for 12 minutes ((m): pCF, (n): CZ-1, (o): CZ-5) are provided, and each electrode is collected after charging at 100 mA $cm^{-2}$ for respective charging times. ((a)-(d)): pCF, ((e)-(h)): CZ-1 and ((i)-(l)): CZ-5.

Example 5: Analysis of Morphology of Zn Electrodeposition at Various Current Densities In order to get more information on the electrodeposition mechanism of each electrode, the structural change of Zn electrodeposited on the pCF, CZ-1 and CZ-5 electrodes was observed for various electrodeposition times (1 second, 30 seconds, 60 seconds and 12 minutes) at a current density of 100 mA/cm$^2$. FIG. 17 in (a) to (d) shows scanning electron microscopy (SEM) images of Zn electrodeposits on pCF at the tip of the carbon fiber. In 1 second, aggregates of micron-sized Zn nanoparticles appeared in a small part of the pCF surface. Instead of the nuclei evenly distributed on the pCF surface, Zn nanoclusters were found to grow perpendicular to the carbon surface (FIG. 17 in (a)). Similar to the result of the DFT calculation, this tip growth of Zn occurs by two stages of nuclear growth: first, the geometrically broken tip portion of the carbon fiber causes a stronger electric field in the corresponding area, and the locally strengthened electric field causes dendrite growth through advantageous electrodeposition in the tip part of the carbon fiber. Then, the Zn atoms and nuclei migrate to the electrodeposited Zn at the tip of the carbon fiber to reduce the surface energy. The formation of Zn aggregates can be understood to be due to the low adsorption energy of the Zn adatom on the defect-free complete graphene surface. As Zn electrodeposition continued, Zn protrusions were observed at the broken tip of the carbon fiber in which the electric field was concentrated (FIG. 17 in (b)).

Additional electrodeposition results in the shape of bulky and separated Zn electrodeposits derived from the tip, using only a portion of the pCF electrode (FIG. 17 in (c) and (d)). In the case of CZ-1, this aggregative Zn growth in the vertical direction was observed at 1 second, similar to pCF (FIG. 17 in (e)). This suggests that the defective carbon structure on CZ-1 cannot prevent the formation of aggregated Zn nuclei. During an additional 30-second electrodeposition, many Zn protrusions were amplified at the tip of the carbon fiber (FIG. 17 in (f)), and vertically grown Zn protrusions merged to form bulky Zn electrodeposits, which connect carbon fibers at 60 seconds (FIG. 17 in (g)). Finally, an additional 12 minutes of electrodeposition resulted in localized Zn electrodeposition (FIG. 17 in (h)). Therefore, in the case of the pCF and CZ-1 electrodes, Zn dendrites are formed in local regions of the electrode, resulting in great polarization for Zn electrodeposition on the electrode. In contrast to the pCF and CZ-1 electrodes, the CZ-5 electrodes had considerably uniform Zn electrodeposition. At 1 second, fine-sized Zn nuclei were distributed over the entire surface of the CZ-5 electrode without any tip growth or lump formation (FIG. 17 in (i)), which suggests that uniform Zn nuclei act effectively as a strong adsorption site having abundant defective carbon sites. After an additional 30 seconds of electrodeposition, the Zn electrodeposits did not form aggregates or protrusions, and covered the surface of the carbon fibers (FIG. 17 in (j)). At 60 seconds, the Zn electrodeposits completely covered the surface, and the Zn electrodeposits grown to the side of the fibers were connected to the electrodeposits of other adjacent fibers (FIG. 17 in (k)). Finally, this means that, unlike the pCF and CZ-1 electrodes, the CZ-5 electrode did not form dendrites and the defective carbon portion of the electrode containing the high-density defective carbon structure effectively suppressed the self-diffusion of Zn adatoms and nuclei.

Figure 18:
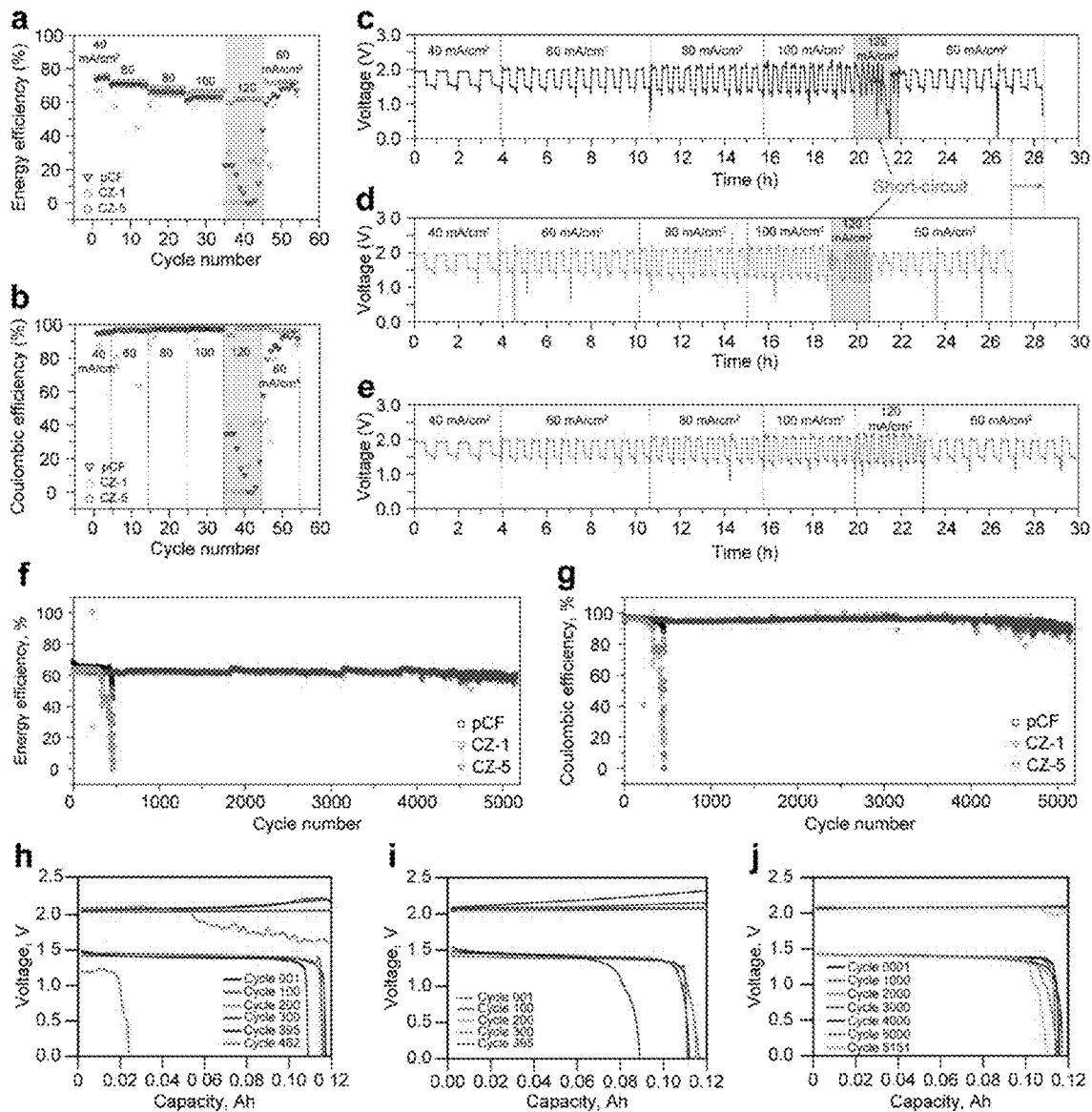
FIG. 18 shows the electrochemical performance of each electrode, with FIG. 18 in (a) and (b) showing coulombs and energy efficiency of ZBB comprising pCF, CZ-1 and CZ-5 electrodes according to current density, with FIG. 18 in (c) showing a charge-discharge profile of ZBB comprising the pCF electrode, with FIG. 18 in (d) showing a charge-discharge profile of ZBB comprising the CZ-1 electrode, with FIG. 18 in (e) showing a charge-discharge profile of ZBB comprising the CZ-5 electrode, with FIG. 18 in (f) showing energy efficiencies (EEs) according to the number of charge/discharge cycles of ZBB comprising pCF, CZ-1 and CZ-5 electrodes, with FIG. 18 in (g) showing coulombic efficiencies (CEs) according to the number of charge/discharge cycles of ZBB comprising pCF, CZ-1 and CZ-5 electrodes, and with FIG. 18 in (h) to (j) showing a charge-discharge voltage capacity profile in each cycle, wherein the long-term electrochemical stability of the pCF, CZ-1 and CZ-5 electrodes was determined by constant current charging/discharging of ZBB at a high current density of 100 mA $cm^{-2}$ and at a fixed charging capacity of 120 mAh.
Figure 19:
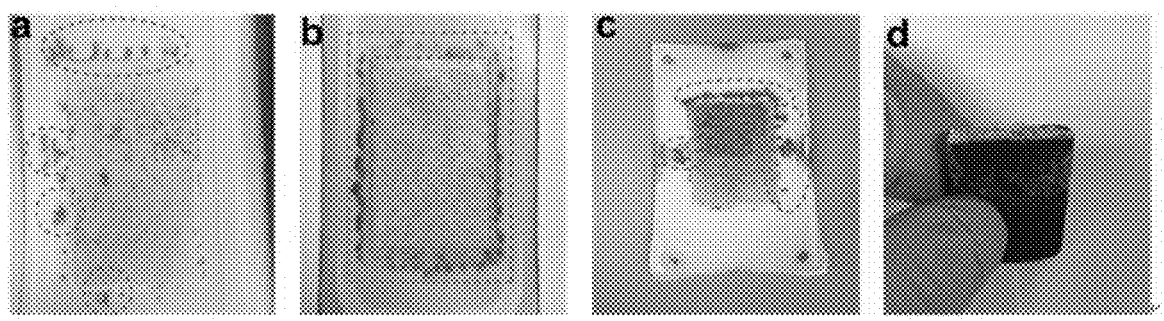
FIG. 19 is a SEM image showing an SF600 separator after a long-term cycling test at a current density of 100 mA $cm^{-2}$ using pCF (shown in (a)), CZ-1 (shown in (b)) and CZ-5 (shown in (c)) electrodes, wherein a Zn metal dendrite can be observed on the electrode, and wherein (d) shows the CZ-5 electrode with the separator removed, indicating that a very small amount of zinc metal dendrite is formed even after long-term cell-cycling tests.
Figure 20:
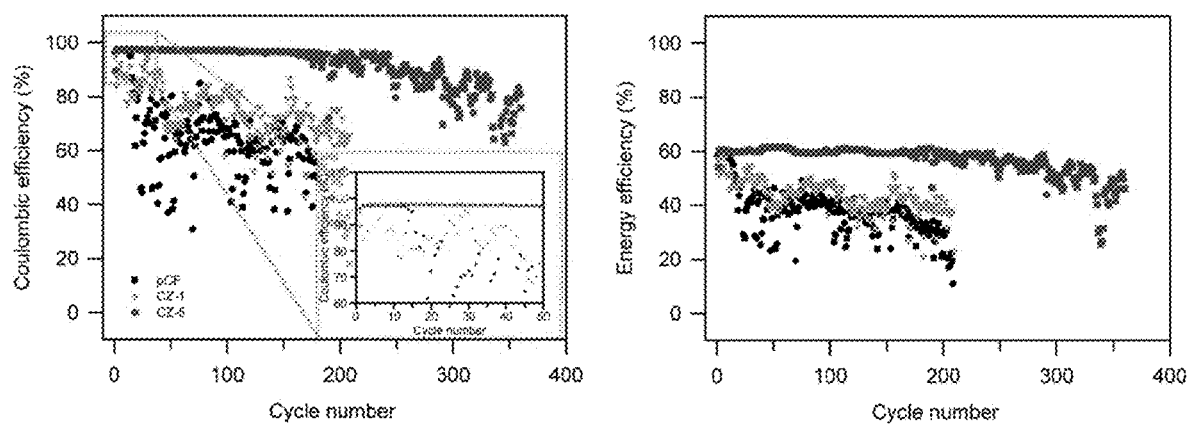
FIG. 20 shows long-term cycling performance of ZBB comprising pCF, CZ-1 and CZ-5 electrodes, wherein constant current charging/discharging was performed at a current density of 120 mA $cm^{-2}$ and at a capacity of 120 mAh.

Example 6: Confirmation of Electrochemical Performance of Zinc Flow Battery Comprising Electrode Containing Defective Carbon Surface In order to confirm the critical current density of Zn plating/peeling, the rate capability of zinc-bromine flow batteries (ZBB) comprising pCF, CZ-1, and CZ-5 electrodes was investigated. The cycling performance of ZBB was tested at a fixed charge capacity of 12 mAh for 10 cycles each at various current densities of 60, 80, 100, 120 and 60 mA/cm$^2$, after conducting 4 cycles at a current density of 40 mA/cm$^2$ (FIG. 18 in (a) to (e)). As shown in FIG. 18 in (a) and (b), only the cells of ZBB (CZ-5@ZBB) containing CZ-5 electrodes have energy efficiency (EE) and coulombic efficiency (CE) of 67% and 97%, respectively, at a plating/peel current density of 120 mA/cm$^2$. In contrast, ZBBs containing pCF and CZ-1 (pCF@ZBB and CZ-1@ZBB) had cell failure at a current density of 120 mA/cm$^2$. Interestingly, pCF@ZBB exhibited EE and CE somewhat higher than CZ-1@ZBB, and maintained a longer rate-characteristic test time (FIG. 18 in (c) and (d)). These results mean that the CZ-1 electrode exhibits more unstable electrochemical performance than the pCF electrode, which is different from general expectations, such as a decrease in the effective current density and the formation of a more uniform metal plating in the electrode that can result in rich nuclei. However, the rapid cell destruction and low rate characteristics of CZ-1, which has a larger surface area than that of pCF and CZ-5 electrodes, suggest that richly formed nuclei with low surface energy without strong adsorption nucleation sites may contribute to the growth of dendrite aggregates. This behavior was also confirmed through a long-term electrochemical stability test (FIG. 18 in (f) to (j)). CE and EE in the pCF@ZBB cell sharply decreased after 462 cycles due to the growth of Zn dendrites during the Zn plating/peeling processes (FIG. 19 shows the dendrites growth of Zn after long-term cell-cycling tests), and CZ-1@BB decreased CE and EE at about 395 cycles. In contrast, CZ-5@ZBB cells showed stable CE (97% or more) and stable growth of Zn after up to 5,000 cycles and effectively inhibited dendrite growth (FIG. 18 in (f) and (g)). The notably excellent electrochemical performance of CZ-5@ZBB was also demonstrated by a cell-cycling test at a charging/discharging current density of 120 mA/cm$^2$ and at a fixed charge capacity of 120 mAh (FIG. 20). CZ-5@ZBB cells showed stable performance even after more than 200 cycles, whereas, in the case of pCF@ZBB cells, CE and EE showed unstable performance after only 20 cycles, and in the case of CZ-1@ZBB, CE and EE declined dramatically in only one cycle. This was similar to the long-term test results at 100 mA/cm$^2$. Compared with other hybrid RFBs (ZBBs, Zn-Iodine (I) RFBs, Zn-Iron (Fe) RFBs, Zn-Cerium (Ce) RFBs), CZ-5@ZBB shows very long lifespan at high current density (FIG. 21 in (a)). Table 1 below shows the references cited in FIG. 21 in (a).

TABLE 1

Figure 21:
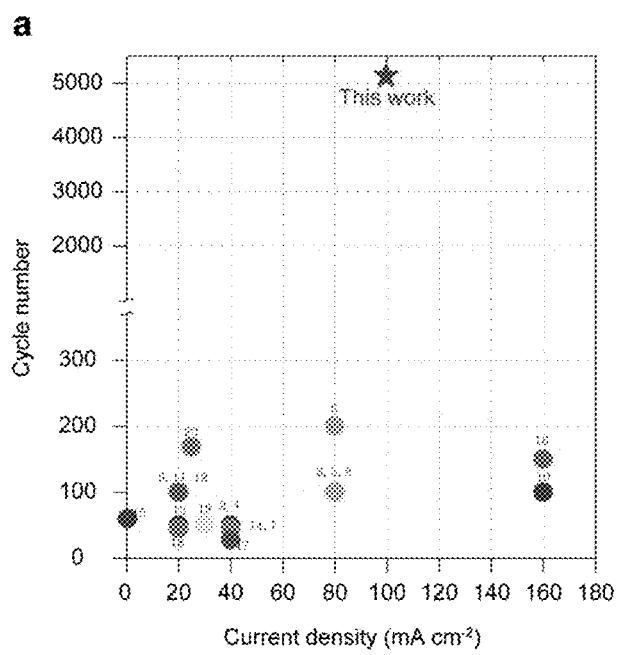
FIG. 21 in (a) shows a comparison in operating current density and lifetime of ZBB comprising a carbon electrode containing a carbon defect structure and conventionally reported Zn-based flow batteries (Zn—Br RFBs, Zn—I RFBs, Zn—Fe RFBs, Zn—Ce RFBs), wherein all values for Zn-based batteries were determined with reference to conventional literature.

Cited references in respective dots of FIG. 21 in (a)

| Dot No. | Reference |
|---|---|
| 2 | M. Wu, T. Zhao, R. Zhang, L. Wei and H. Jiang, Electrochim. Acta, 2018, 284, 569-576. |
| 3 | H. Lin, L. Bai, X. Han, Y. Zhang and J. Shi, INTERNATIONAL JOURNAL OF ELECTROCHEMICAL SCIENCE, 2018, 13, 12049-12061. |
| 4 | M. Wu, R. Zhang, K. Liu, J. Sun, K. Chan and T. Zhao, J Power Sources, 2019, 442, 227255. |
| 5 | H. X. Xiang, A. D. Tan, J. H. Piao, Z. Y. Fu and Z. X. Liang, Small, 2019, 15, 1901848. |
| 6 | S. Bae, J. Lee and D. S. Kim, J Power Sources, 2019, 413, 167-173. |
| 7 | M. Wu, H. Jiang, R. Zhang, L. Wei, K. Y. Chan and T. Zhao, Electrochim. Acta, 2019, 318, 69-75. |
| 8 | M. Kim, D. Yun and J. Jeon, J Power Sources, 2019, 438, 227020. |
| 9 | C. Wang, W. Lu, Q. Lai, P. Xu, H. Zhang and X. Li, Adv. Mater., 2019, 1904690. |

TABLE 1-continued

Cited references in respective dots of FIG. 21 in (a)

| Dot No. | Reference |
|---|---|
| 10 | N. Venkatesan, K. S. Archana, S. Suresh, R. Aswathy, M. Ulaganthan, P. Periasamy and P. Ragupathy, ChemElectroChem., 2019, 6, 1107-1114. |
| 11 | S. Suresh, M. Ulaganathan and R. Pitchai, J Power Sources, 2019, 438, 226998. |
| 12 | S. Ito, M. Sugimasa, Y. Toshimitsu, A. Orita, M. Kitagawa and M. Sakai, Electrochim. Acta, 2019, 319, 164-174. |
| 13 | J. Liu, T. Ma, M. Zhou, S. Liu, J. Xiao, Z. Tao and J. Chen, Inorganic Chemistry Frontiers, 2019, 6, 731-735. |
| 14 | G.-M. Weng, Z. Li, G. Cong, Y. Zhou and Y.-C. Lu, Energy & Environmental Science, 2017, 10 (3), 735, 741. |
| 15 | Z. Yuan, Y. Duan, T. Liu, H. Zhang and X. Li, iScience, 2018, 3, 40-49. |
| 16 | Z. Yuan, X. Liu, W. Xu, Y. Duan, H. Zhang and X. Li, Nat. Commun., 2018, 9, 3731. |
| 17 | Y. Zhang, D. Henkensmeier, S. Kim, R. Hempelmann and R. Chen, J. Energy Storage, 2019, 25, 100883. |
| 18 | Z. Xie, B. Liu, C. Xie, B. Yang, Y. Jiao, D. Cai, L. Yang, Q. Shu and A. Shi, Materials Chemistry and Physics, 2018, 220, 208-215. |
| 19 | K. Amini and M. D. Pritzker, Applied Energy, 2019, 255, 113894. |
| 20 | F. Wang, O. Borodin, T. Gao, X. Fan, W. Sun, F. Han, A. Faraone, J. A. Dura, K. Xu and C. Wang, Nature materials, 2018, 17, 543. |

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

INDUSTRIAL APPLICABILITY

The electrode comprising a carbon layer containing a high-density carbon defect structure on the surface of the electrode according to the present invention prevents deterioration of battery performance due to dendrite formation by inhibiting self-diffusion and aggregation of metal nuclei, and exhibits a dramatically improved number of charge/discharge cycles and excellent energy efficiency beyond a simple increase in the density of a carbon defect structure by uniformly electrodepositing metal ions on the surface of the electrode. When the method of producing a carbon electrode for a secondary battery of the present invention is used, an electrode containing a uniformly distributed high-density carbon defect structure can be produced, and thus a battery with higher efficiency and a longer lifespan can be produced. The secondary battery comprising the electrode is useful for fields related to medium/large-scale energy storage technology, particularly mobile devices, automobile batteries, and renewable energy power generation systems.

What is claimed is:

1. A method of producing an electrode for a Zn-based secondary battery containing a carbon defect structure, the method comprising:
   (a) coating with a metal-organic framework (MOF) on an electrode substrate; and
   (b) carbonizing the MOF-coated electrode substrate of step (a) to form a carbon layer containing a carbon defect structure comprising defective turbostratic carbon,
   wherein the step (b) is performed by heating at 1000 to 1500° C. for 5 to 7 hours and evaporating metals and atoms other than carbon atoms without a secondary carbon source, and
   wherein the carbon defect structure is a single-vacancy defect structure having at least 1.4 of a ratio (ID/IG) of a 1,350 cm$^{-1}$ band (D band) to a 1,585 cm$^{-1}$ band (G band), measured by Raman scattering, and an XPS sp3/sp2 intensity ratio of 0.73,
   wherein the electrode substrate comprises at least one selected from the group consisting of carbon felt, a carbon electrode, an indium tin oxide (ITO) electrode, and a fluorine tin oxide (FTO) electrode,
   wherein the Zn-based secondary battery is a zinc flow battery.

2. The method according to claim 1, wherein the metal-organic framework is selected from the group consisting of $Zn_2DOT$, $Cu_2(BDC-Br)_2(H_2O)_2$, $ZN_4O(BTB)_2$, $[Fe_3O(BDC)_3(DMF)_3][FeCl_4]·(DMF)_3$, $Al(OH)(BPYDC)$, $ZN_4O(BDC)_3·7DEF·3H_2O$, $Zn_4O(TPDC)_3·17DEF·2H_2O$, $Zr_6O_6(BDC)_6$, $Zr_6O_6(BPDC)_6$, $Zr_6O_6(TPDC)_6$, $Al(OH)(BDC)$, $Al(OH)(BDC-NH_2)$, $Fe_3O(MeOH)_3(O_2CCH=CHCO_2)_3·MeCO_2·nH_2O$, $Fe_3O(MeOH)_3(O_2C(CH_2)_2CO_2)_3·AcO·(MeOH)_{4.5}$, $2Fe_3O(OH)(H_2O)_2(BDC-Me_2)_3$, $Fe^{III}_3O(H_2O)_2F·(BTC)_2·nH_2O$, $Cr_3O(H_2O)_2F·(BDC)_3·NH_2O$, $Cu_3(BTC)_2$, $Gd_2(BDC-NH_2)_3(DMF)_4$, $Zn(MIM)_2$, $Zn(FIM)_2$, $Cu_2(PZDC)_2(4,4'-BPY)$, $[Cu(HFBBA)(phen)_2](H_2HFBBA)_2(H_2O)(HCO_2)$, and $Cu_{24}(m-BDC)_{24}(DMF)_{14}(H_2O)_{10}$.

3. The method according to claim 1, wherein the metal-organic framework is a zeolitic imidazole framework.

4. The method according to claim 1, further comprising oxidizing the electrode substrate before step (a).

5. The method according to claim 1, wherein the single-vacancy defect structure has 1.4 to 2.0 of a ratio (ID/IG) of a 1,350 cm$^{-1}$ band (D band) to a 1,585 cm$^{-1}$ band (G band), measured by Raman scattering.

* * * * *